(12) United States Patent
Okoli et al.

(10) Patent No.: US 11,214,317 B2
(45) Date of Patent: Jan. 4, 2022

(54) SYSTEMS AND METHODS FOR JOINING NODES AND OTHER STRUCTURES

(71) Applicant: DIVERGENT TECHNOLOGIES, INC., Los Angeles, CA (US)

(72) Inventors: Chukwubuikem Marcel Okoli, Los Angeles, CA (US); David Brian TenHouten, Los Angeles, CA (US); Antonio Bernerd Martinez, El Segundo, CA (US); Muhammad Faizan Zafar, Long Beach, CA (US); William David Kreig, Huntington Beach, CA (US); Kevin Robert Czinger, Santa Monica, CA (US); Broc William TenHouten, Rancho Palos Verdes, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 423 days.

(21) Appl. No.: 15/961,767

(22) Filed: Apr. 24, 2018

(65) Prior Publication Data
US 2019/0322055 A1    Oct. 24, 2019

(51) Int. Cl.
*B62D 29/04* (2006.01)
*B29C 65/54* (2006.01)
(Continued)

(52) U.S. Cl.
CPC .......... *B62D 29/046* (2013.01); *B29C 65/524* (2013.01); *B29C 65/542* (2013.01);
(Continued)

(58) Field of Classification Search
CPC .................................................. B62D 29/046
See application file for complete search history.

(56) References Cited

U.S. PATENT DOCUMENTS 3,920,268 A    11/1975   Stewing
4,211,259 A *   7/1980   Butler ..................... B29C 65/42
                                                          138/109
(Continued)

FOREIGN PATENT DOCUMENTS

WO    1996036455 A1    11/1996
WO    1996036525 A1    11/1996
(Continued)

OTHER PUBLICATIONS

US 9,202,136 B2, 12/2015, Schmidt et al. (withdrawn)
(Continued)

*Primary Examiner* — Christopher T Schatz
(74) *Attorney, Agent, or Firm* — Arent Fox LLP

(57) ABSTRACT

An additively manufactured node is disclosed. A node is an additively manufactured (AM) structure that includes a feature, e.g., a socket, a channel, etc., for accepting another structure, e.g., a tube, a panel, etc. The node can include a node surface of a receptacle extending into the node. The receptacle can receive a structure, and a seal interface on the node surface can seat a seal member between the node surface and the structure to create an adhesive region between the node and the structure, the adhesive region being bounded by the node surface, the structure, and the seal member. The node can also include two channels connecting an exterior surface of the node to the adhesive region. In this way, adhesive can be injected into the adhesive region between the node and the structure, and the adhesive can be contained by the seal member.

11 Claims, 17 Drawing Sheets

(51) Int. Cl.
*B29C 65/52* (2006.01)
*B62D 27/02* (2006.01)
*B62D 23/00* (2006.01)
*B29C 65/00* (2006.01)

(52) U.S. Cl.
CPC .......... *B29C 65/544* (2013.01); *B62D 23/005* (2013.01); *B62D 27/023* (2013.01); *B62D 29/048* (2013.01); *B29C 66/1122* (2013.01); *B29C 2791/006* (2013.01)

(56) References Cited

U.S. PATENT DOCUMENTS

| | | | |
|---|---|---|---|
| 5,203,226 A | 4/1993 | Hongou et al. | |
| 5,742,385 A | 4/1998 | Champa | |
| 5,851,036 A | 12/1998 | Vanesky | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |

(56) References Cited

U.S. PATENT DOCUMENTS

| | | |
|---|---|---|
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |

(56) References Cited

U.S. PATENT DOCUMENTS

| | | |
|---|---|---|
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2010/0259040 A1 | 10/2010 | Kjolseth et al. |
| 2014/0277669 A1 | 9/2014 | Nardi et al. |
| 2017/0001368 A1 | 1/2017 | Czinger et al. |
| 2017/0051791 A1* | 2/2017 | Leko ............... F16D 1/068 |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated May 17, 2019, regarding PCT/US2019/022034.

* cited by examiner

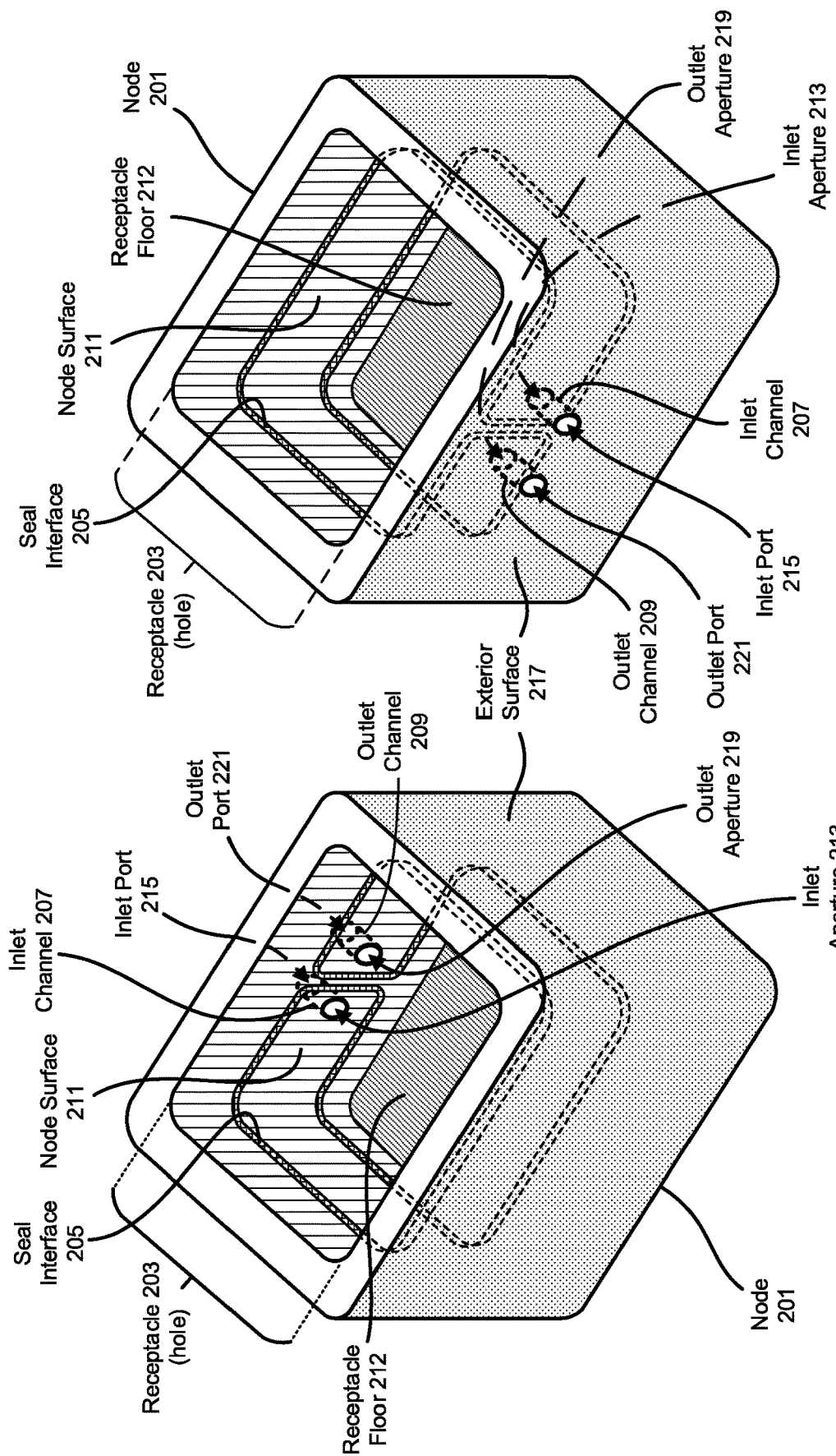

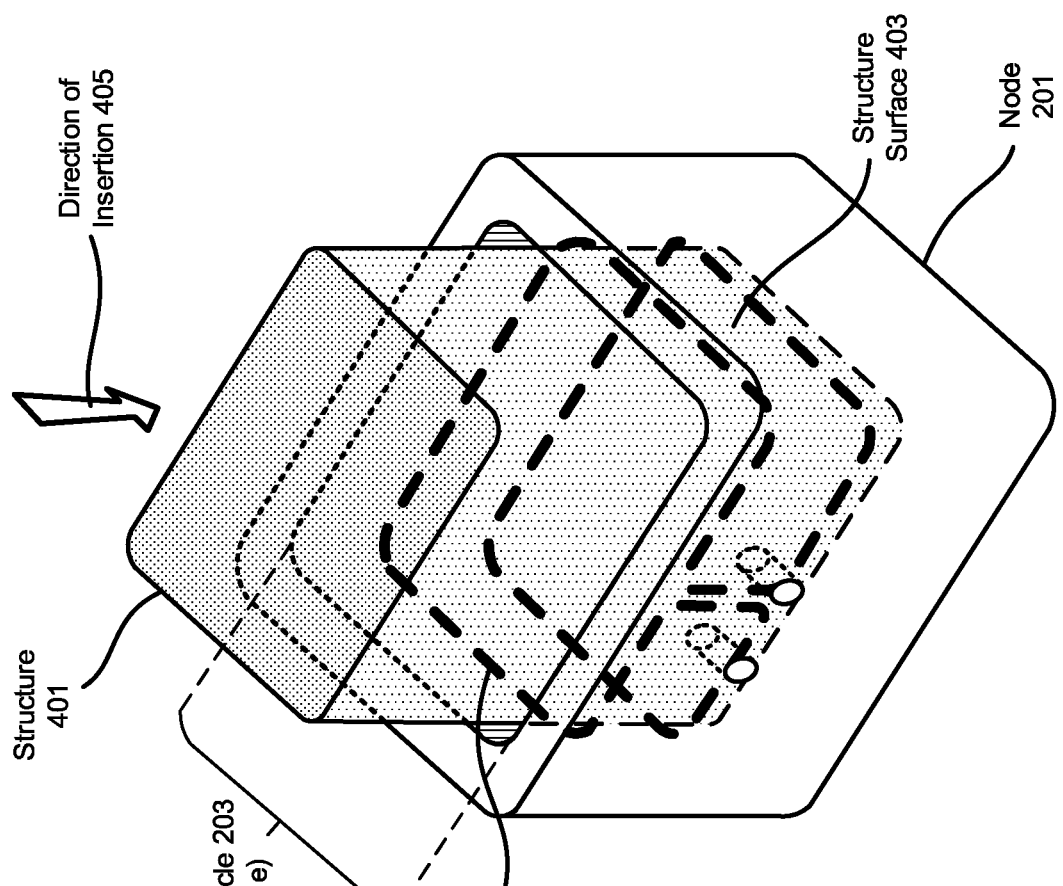
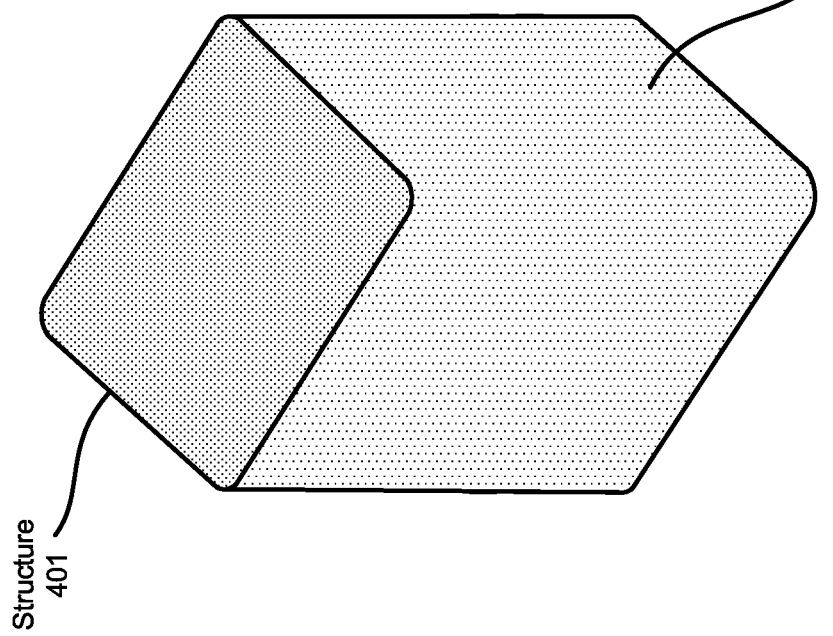
FIG. 4B
FIG. 4A

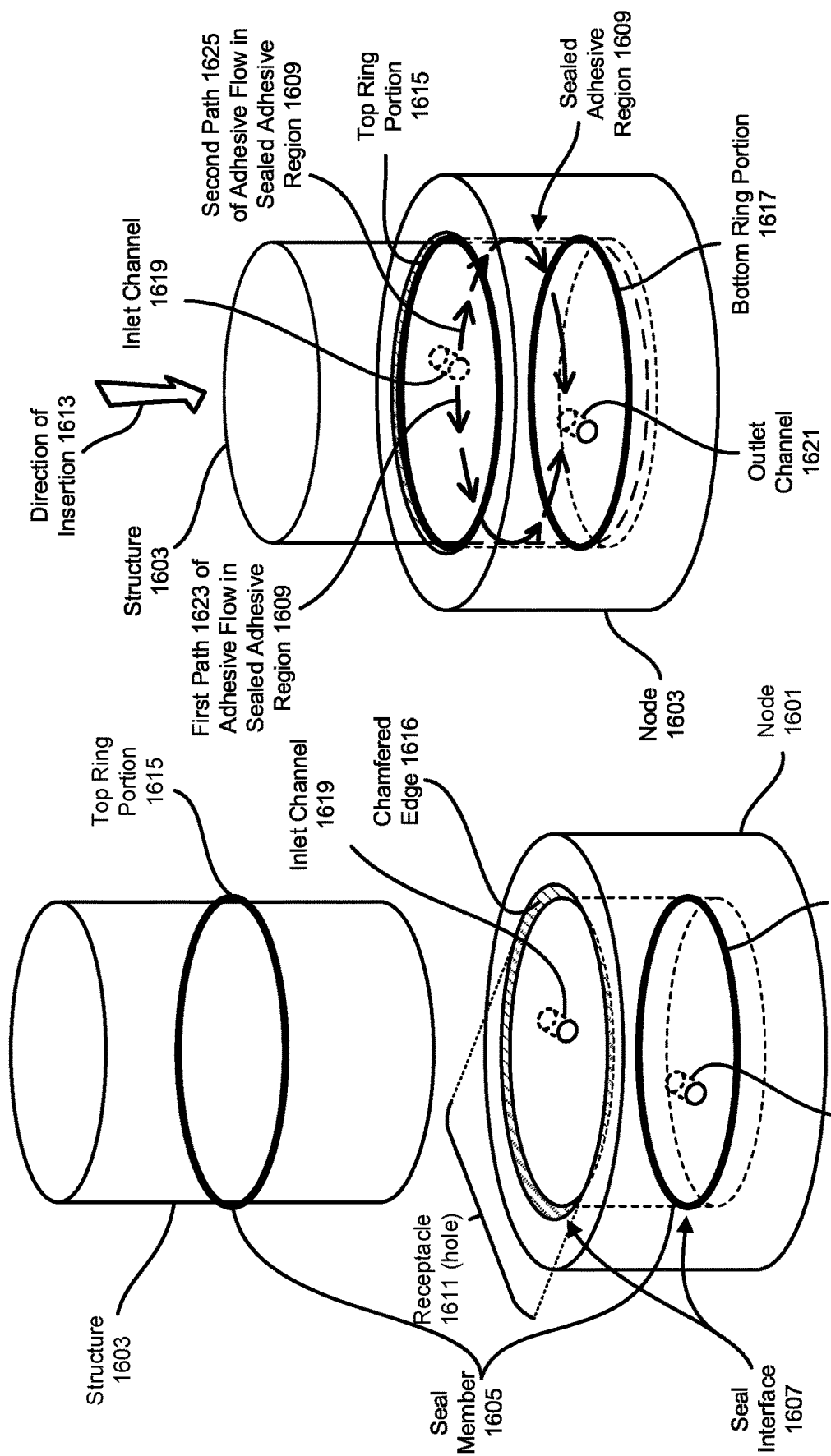

SYSTEMS AND METHODS FOR JOINING NODES AND OTHER STRUCTURES

BACKGROUND

Field

The present disclosure relates generally to joints created between nodes and other structures, and more particularly, to joints that include an adhesive region for the application of adhesive between nodes and other structures.

Background

Space frame and monocoque construction techniques are used in automotive, structural, marine, and many other applications. One example of space frame construction is a welded tube frame chassis construction, often used in low-volume and high-performance vehicle designs due to the advantages of low tooling costs, design flexibility, and the ability to produce high-efficiency structures. Space frames can require the structures that make up the chassis to be connected at a wide variety of angles and may require the same connection point to accommodate a variety of structure geometries. Traditional methods of fabrication of joint members for connection of such tube frame chassis may incur high equipment and manufacturing costs. Additionally, monocoque design may lead to design inflexibility when using planar elements, or high tooling costs when shaped panels are incorporated.

SUMMARY

Several aspects of nodes, node-structure connections, and methods will be described more fully hereinafter.

In various aspects, an additively manufactured node can include a node surface that has a receptacle extending into the node. The receptacle can receive a structure, and a seal interface on the node surface can seat a seal member between the node surface and the structure to create an adhesive region between the node and the structure, the adhesive region being bounded by the node surface, the structure, and the seal member. The node can also include two channels connecting an exterior surface of the node to the adhesive region. In this way, for example, adhesive can be injected into the adhesive region between the node surface of the node and the structure, and the adhesive can be contained by the seal member.

In various aspects, an apparatus can include an additively manufactured node having a receptacle extending into the node, the receptacle including a first surface, and the node including an exterior surface, a first channel connecting the exterior surface to the first surface, and a second channel connecting the exterior surface to the first surface. The apparatus can further include a structure inserted in the receptacle, the structure including a second surface opposing the first surface. The apparatus can further include a seal member arranged between the node and the structure. An adhesive region between the node and the structure can be bounded by the first surface, the second surface, and a surface of the seal member. The adhesive region can connect to each of the first and second channels. The apparatus can further include an adhesive arranged in the adhesive region. The adhesive can adjoin the seal member surface and can attach the first surface to the second surface.

In various aspects, a method can include arranging a seal member in a receptacle extending into an additively manufactured node, the receptacle including a first surface. The method can further include inserting a structure into the receptacle, the structure including a second surface opposing the first surface. An adhesive region can be formed between the node and the structure, the adhesive region being bounded by the first surface, the second surface, and the seal member. The method can further include applying an adhesive into the adhesive region, for example, by injecting the adhesive. In this way, for example, the adhesive can be applied into the adhesive region, and the applied adhesive can be contained by the seal member.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of joints created between nodes and other structures, and more particularly, to joints that include an adhesive region for the application of adhesive between nodes and other structures will now be presented in the detailed description by way of example, and not by way of limitation, in the accompanying drawings, wherein:

FIGS. 2A-B illustrate two views of an exemplary node in accordance with various embodiments.

FIG. 4A illustrates an exemplary structure, and FIG. 4B illustrates the structure inserted in a receptacle of the exemplary node.

FIGS. 16A-B illustrate another exemplary embodiment including a node, a structure, and a seal member seated on a seal interface.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

This disclosure focuses on joint designs utilizing nodes. A node is an additively manufactured (AM) structure that includes a feature, e.g., a socket, a receptacle, etc., for accepting another structure, e.g., a tube, a panel, etc. Nodes can be formed by fusing a powder material. For example, a 3-D printer can melt and/or sinter at least a portion of the powder material in multiple layers to form the node. Nodes may be formed of one or more metal and/or non-metal materials. The node may be formed of a substantially rigid material. The materials in a node may include a metallic material (e.g. aluminum, titanium, stainless steel, brass, copper, chromoly steel, iron, etc.), a composite material (e.g. carbon fiber composite, etc.), a polymeric material (e.g. plastic, etc.), a combination of these materials and/or other materials, etc.

Nodes can be particularly useful in joint designs for connecting various parts of complex structures, for example. In some designs, nodes can allow for higher levels of dimensional tolerance acceptance that may be needed when assembling complex structures. Node-based designs can also allow for reduced weight, reduced post-processing, and increased ease of assembly. In addition, nodes can be used as sockets to adjust for tolerance in designs, and nodes can be co-printed with other parts, which takes advantage of a unique benefit of 3-D printing to simplify the assembly process.

Figure 1:
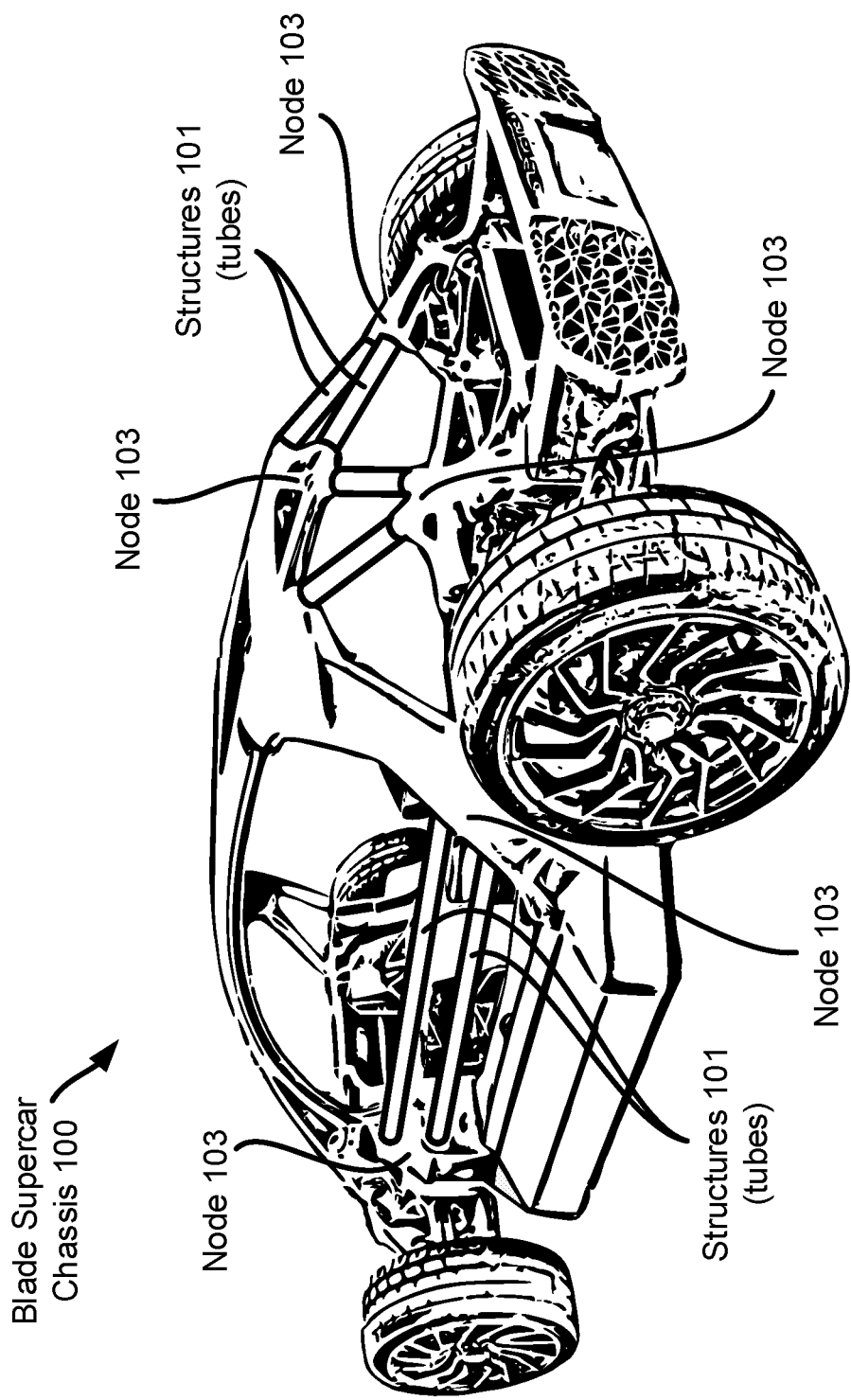
FIG. 1 shows an exemplary vehicle chassis, Blade supercar chassis, in which aspects of the disclosure may be implemented.

FIG. 1 illustrates an exemplary car chassis, i.e., Blade supercar chassis 100 built by Divergent Technologies, Inc., that includes nodes and connecting structures, e.g., tubes, attached to the nodes. Automobile chassis, such as Blade supercar chassis 100, are examples of structures in which aspects of the disclosure can be practiced. Although the examples described herein are directed primarily to vehicle structures, such as chassis, crush zones, etc., it should be understood that aspects of the disclosure can be applied to other structures that include node-structure connections.

Blade supercar chassis 100 includes structures 101, which are tubes in this example, connected by one or more nodes 103. Each node 103 can include, for example, a central body and one or more ports that extend from the central body. In various embodiments, a multi-port node may be provided to connect structures, such as structures 101, to form a two or three-dimensional structure. The structure may be a frame, for example. In one example, a structure having tubes with axes in substantially the same plane can be referred to as a planar frame, while a structure having tubes with axes in different planes may be referred to as a space frame. A space frame may define a volume. In some examples, a three-dimensional space frame structure may be a vehicle chassis. The vehicle chassis may be have a length, width, and height that define a space, such as a passenger compartment of the vehicle.

A vehicle chassis may form the framework of a vehicle. A vehicle chassis may provide the structure for placement of body panels of a vehicle, such as door panels, roof panels, floor panels, or any other panels forming the vehicle enclosure. Furthermore the chassis may be the structural support for the wheels, drive train, engine block, electrical components, heating and cooling systems, seats, storage space, etc. A vehicle may be a passenger vehicle, a cargo vehicle, etc. Examples of vehicles may include, but are not limited to sedans, trucks, buses, vans, minivans, station wagons, RVs, trailers, tractors, go-carts, automobiles, trains, or motorcycles, boats, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis.

The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. In some cases, inner supports or components may be provided. The inner supports or components can be connected to the space frame through connection to the one or more joint members of the space frame. Different layouts of multi-port nodes and connecting tubes may be provided to accommodate different vehicle chassis configurations. In some cases, a set of nodes can be arranged to form a single unique chassis design. In some cases, at least a subset of the set of nodes can be used to form multiple chassis designs. In some cases at least a subset of nodes in a set of nodes can be assembled into a first chassis design and then disassembled and reused to form a second chassis design. The first chassis design and the second chassis design can be the same or they can be different.

The connecting structures may be formed from rigid materials. For example, the structures may be formed of metal, such as steel, aluminum, etc., composite materials, such as carbon fiber, etc., or other materials, such as plastics, polymers, etc. The connecting structures may have different cross-sectional shapes. For example, the connecting tubes may have a substantially circular shape, square shape, oval shape, hexagonal shape, or an irregular shape. The connecting tube cross-section could be a closed cross-section. The connecting tube cross-section could be an open cross-section, such as a C-channel, an I-beam, an angle, etc.

Various aspects of node-to-structure connections presented in this disclosure may be suitable for use in a vehicle chassis, such as Blade supercar chassis 100 shown in FIG. 1. The nodes in the chassis 100 may be designed to fit the connecting structure angles dictated by the chassis design. The nodes may be fabricated to desired geometries to permit rapid and low cost assembly of the chassis. In some embodiments the nodes may be fabricated using 3-D printing techniques. 3-D printing may permit the nodes to be formed in a wide array of geometries that may accommodate different frame configurations. 3-D printing may permit the nodes to be formed based on a computer generated design file that includes dimensions of the nodes.

Figure 17:
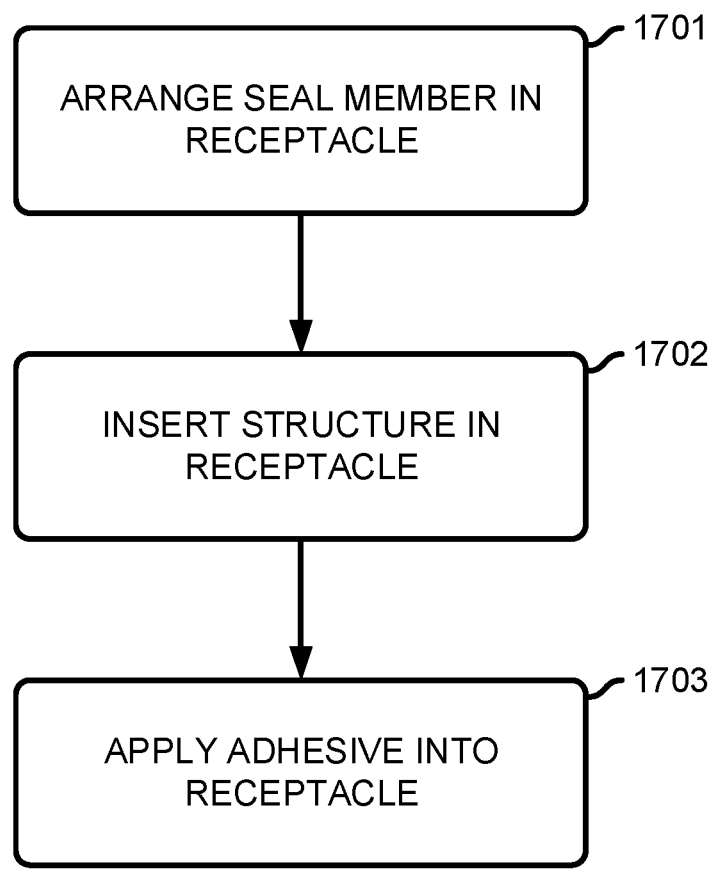
FIG. 17 is a flowchart that illustrates an exemplary process of adhering an additively manufactured node to a structure.

FIGS. 2A-B, 3A-B, 4A-B, 5, 12, 13, 14, 15A-B, and 16A-B illustrate exemplary nodes and node-structure joints (a.k.a., connections). FIGS. 6-11 illustrate exemplary processes for adhesive application to adhere a node to a structure. FIG. 17 is a flowchart that illustrates an exemplary process of adhering a node to a structure.

The examples described below include nodes that can have a receptacle with a seal interface configured to seat a seal member, such as an O-ring, a curable sealant, etc. Inserting a seal member and a structure in the node's receptacle can create a sealed adhesive region between the node and the structure. The adhesive region can be used to apply an adhesive, such as a glue, an epoxy, a thermoplastic, a thermoset, etc., between the node and the structure to create a joint. The seal member can prevent the adhesive from leaking out of the adhesive region, which may allow the joint to be formed more efficiently and may provide a cleaner-looking joint. In addition, the seal member can keep the node and the structure separated at a desired distance while the adhesive cures. The distance created by the seal member between the node and the structure can be designed to prevent or reduce a reaction between the node and the structure, such as galvanic corrosion. The seal member can remain after the adhesive cures to help protect the cured adhesive from the environment, e.g., air, water, etc., which may reduce damage or degradation of the adhesive caused by environmental factors. Depending on the composition and design of the seal member, the seal member may provide other benefits, such as adding rigidity, flexibility, durability, etc., to the joint.

FIGS. 2A-B illustrate two views of an exemplary node 201. FIG. 2A shows a first view, and FIG. 2B shows a view in which node 201 is rotated 180 degrees from its position in the first view. Node 201 can include a receptacle 203 extending into the node that can receive a structure, a seal interface 205 for seating a seal member in the receptacle, and two channels (an inlet channel 207 and an outlet channel 209) for an adhesive application process to adhere the node to the structure. In this example, receptacle 203 is a hole bound by a node surface 211 in node 201 and having a receptacle floor 212. Node surface 211 can include seal interface 205. In this example, seal interface 205 is a groove that can seat a rubber seal member in node surface 211. Inlet channel 207 can connect an opening (an inlet aperture 213) in node surface 211 to an opening (an inlet port 215) in an exterior surface 217, of node 201. Likewise, outlet channel 209 can connect an opening (an outlet aperture 219) in node surface 211 to an opening (an outlet port 221) in exterior surface 217. Locating ports on an exterior surface, i.e., a surface of the node that is accessible after the structure is inserted, can allow easy access to the ports.

In various embodiments, a node can include an isolator interface that can accept an isolator. An isolator can maintain a desired distance between a surface of the node and a surface of a structure inserted into the node's receptacle. For example, a node such as node 203 can include an interface on a receptacle floor such as receptacle floor 212 on which an isolator such as a nylon disk can also be arranged. When a structure is inserted into the receptacle, the nylon disk on the receptacle floor can prevent the end of the structure from contacting the receptacle floor and can maintain a desired distance of separation. Maintaining a separation distance may be helpful to reduce or prevent galvanic corrosion, particularly in joints in which the node and the inserted structure are composed of materials with very different electrode potentials.

Figure 3B:
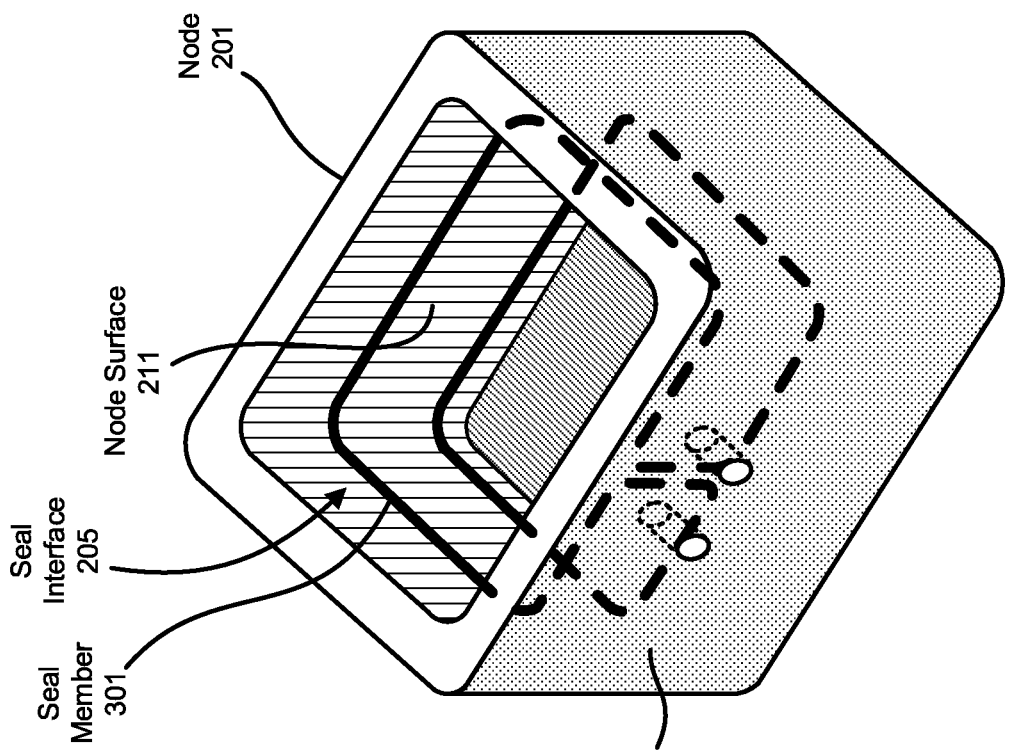
FIGS. 3A-B illustrate two views of the exemplary node with a seal member seated on a seal interface.
Figure 3A:
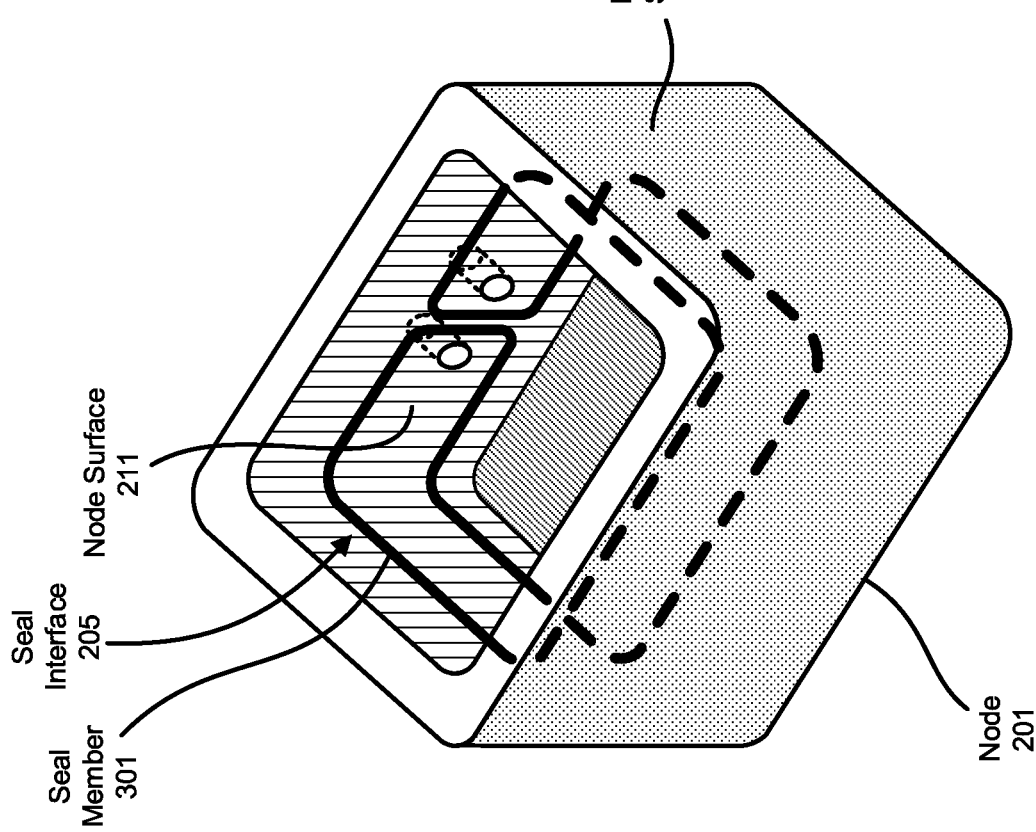

FIGS. 3A-B illustrate two views of exemplary node 201 with a seal member 301 seated on seal interface 205. As in FIGS. 2A-B above, FIG. 3A shows a first view, and FIG. 3B shows a view in which node 201 is rotated 180 degrees from its position in the first view. Seal interface 205 can be any feature suitable for seating a seal member at a node surface of a node. In some embodiments, a seal interface can include a feature of the node surface itself. For example, a seal interface can be a recessed feature of the node surface, such as a groove, a protruding feature of the node surface, such as a protruding lip, or another feature of the node surface, such as a chamfered edge of the node surface, a polished portion of the node surface, etc. A chamfered edge and/or polished portion of the node surface, for example, can be used as a seal interface for seal members that are attached to the structure prior to insertion of the structure into the receptacle, such as in the examples illustrated by FIGS. 16A and 16B. In this regard, the smooth node surface can help prevent damage to the seal member while the structure is being inserted into the receptacle, and the chamfered edge can help guide the structure into a final position. In some embodiments, a seal interface can be simply an unrefined node surface. In some embodiments, a seal interface can be a feature that is added to the node surface. For example, a seal interface can be an adhesive applied to the node surface, a flange that is welded to the node surface, a retaining collar that is inserted in the receptacle, etc.

In the example shown in FIG. 3A-B, seal interface 205 is a groove in node surface 211, and seal member 301 is a rubber seal that is inserted into the groove. Part of seal member 301 rests in the groove, and part of the seal member protrudes from the groove into receptacle 203. This protruding portion of the seal member can engage with the structure upon its insertion into the receptacle, thereby forming a seal between.

FIG. 4A illustrates an exemplary structure 401, and FIG. 4B illustrates the structure inserted in receptacle 203 of node 201. Structure 401 can be, for example a connecting structure in a space frame, such as a vehicle chassis. Structure 401 may be formed from materials such as metal, composite materials, or other materials, such as plastics, polymers, etc. Structure 401 has a structure surface 403 that can have a shape configured to fit into receptacle 203, such that the structure surface opposes node surface 211 when the structure is inserted in the receptacle. In this regard, different structures may have different shapes and, correspondingly, different nodes can have receptacles of different shapes. For example, structures and node receptacles can have substantially circular shapes, square shapes, oval shapes, hexagonal shapes, irregular shapes, etc.

In various embodiments, a node receptacle can extend around a perimeter of the structure, such as in the present embodiment in which receptacle 203 is a hole in node 201. In various embodiments, the hole can have a bottom (i.e., does not extend completely through the node). In various embodiments, the hole can extend completely through the node. In various embodiments, the node receptacle can extend only partway around a perimeter of the structure, an example of which is described with reference to FIG. 14 below.

FIG. 4B shows structure 401 inserted in receptacle 203 and also shows a direction of insertion 405 of the structure into the receptacle. When structure 401 is inserted in receptacle 203, structure surface 403 contacts seal member 301, thus creating a space bounded by the structure surface, node surface 211, and the seal member. Structures can be inserted into nodes using various manual or automated methods. For example, a node can be fixed in a fixture, and the structure can be inserted and allowed to float in the receptacle during the adhesion process. Floating a structure in a fixed node can allow the seal member to provide the primary forces that position the structure within the receptacle. In this way, for example, dimensional tolerances of the joint may be improved. This method can be particularly beneficial when creating larger, more complex space structures that have many joints because positioning errors in individual joints can add up to create larger positioning errors across the space structure.

Figure 5:
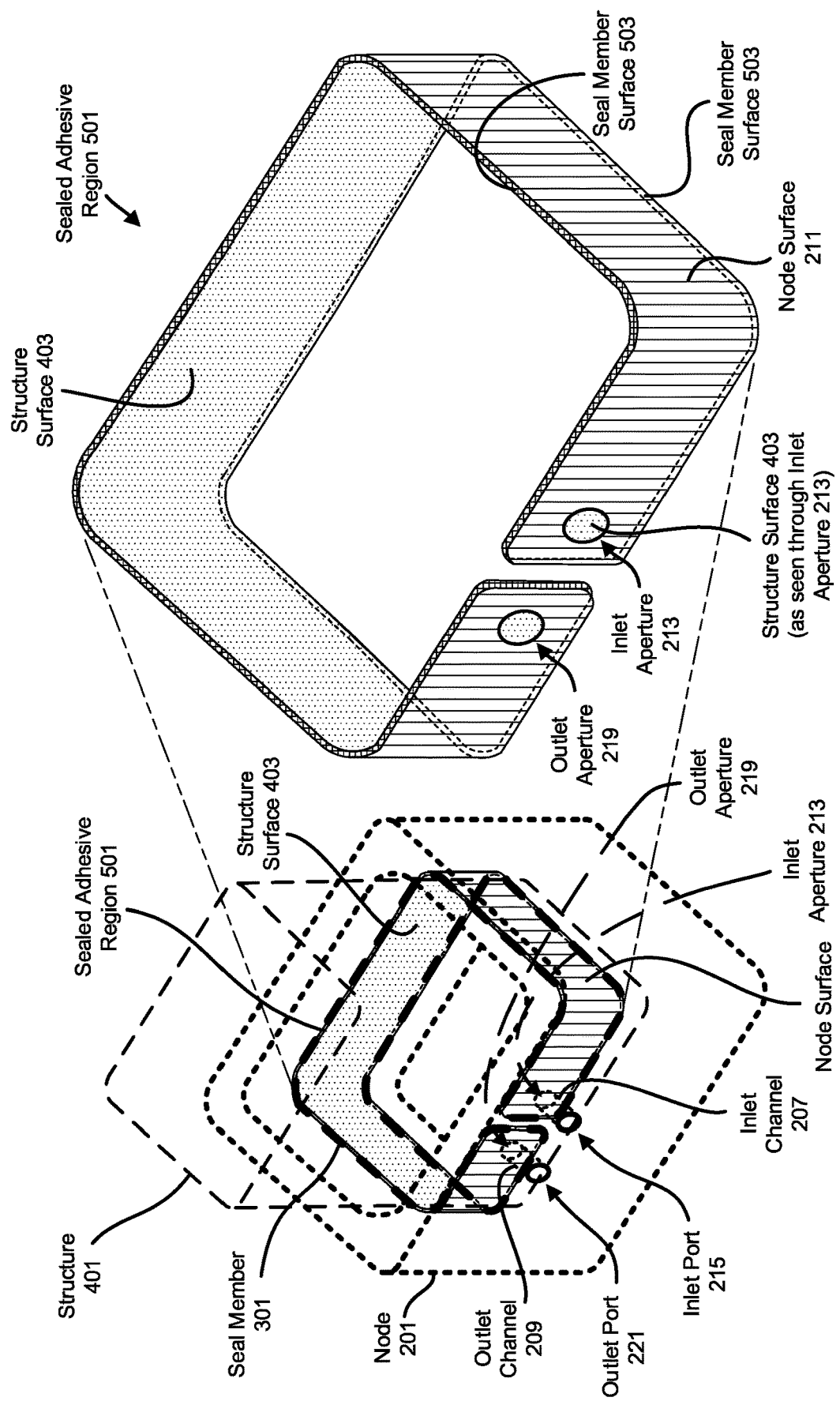
FIG. 5 illustrates a more detailed view of the exemplary structure inserted in the exemplary node.

FIG. 5 illustrates a more detailed view of structure 401 inserted in node 201, and in particular, shows details of an exemplary sealed adhesive region 501 created by inserting the structure into the node. It is noted that node 201 and structure 401 are represented by dashed lines in FIG. 5 and subsequent figures to provide a clearer view of the corresponding sealed adhesive regions. In addition, FIG. 5 shows a view of sealed adhesive region 501 between node 201 and structure 401, and also shows an unobstructed, magnified view of the sealed adhesive region so that details of the sealed adhesive region may be easily seen.

As described above with reference to FIG. 4B, when structure 401 is inserted in receptacle 203, structure surface 403 contacts seal member 301, thus creating a bounded space between the structure surface, node surface 211, and the seal member; this space is shown as sealed adhesive region 501 in FIG. 5. In other words, sealed adhesive region 501 is a space bounded by node surface 203, structure surface 403, and a portion of the surface of seal member 301, which is shown as seal member surface 503 in FIG. 5. In this example, sealed adhesive region 501 is an adhesive region that has a thin, rectangular cross-section and that extends around the perimeter of structure 401 with one end located at inlet aperture 213 and the other end located at outlet aperture 219.

In this regard, it can be seen that seal interface 205 of node 201 and seal member 301 are configured to extend around the perimeter of structure 401 inserted in receptacle 203, such that sealed adhesive region 501 extends around the perimeter of the structure with a first end of the sealed adhesive region opposing a second end of the sealed adhesive region. Inlet channel 207 connects to sealed adhesive region 501 proximate to the first end through inlet aperture 213, and outlet channel 209 connects to the sealed adhesive region proximate to the second end through outlet aperture 219. In this way, for example, one end of sealed adhesive region 501 can be open to exterior surface 217 of node 201 through inlet channel 207, and the other end of the sealed adhesive region can be open to the exterior surface of the node through outlet channel 209. Therefore, sealed adhesive region 501 can be accessible through inlet port 215 and outlet port 221 for an adhesive application process that will now be described with reference to FIGS. 6-11.

Figure 6:
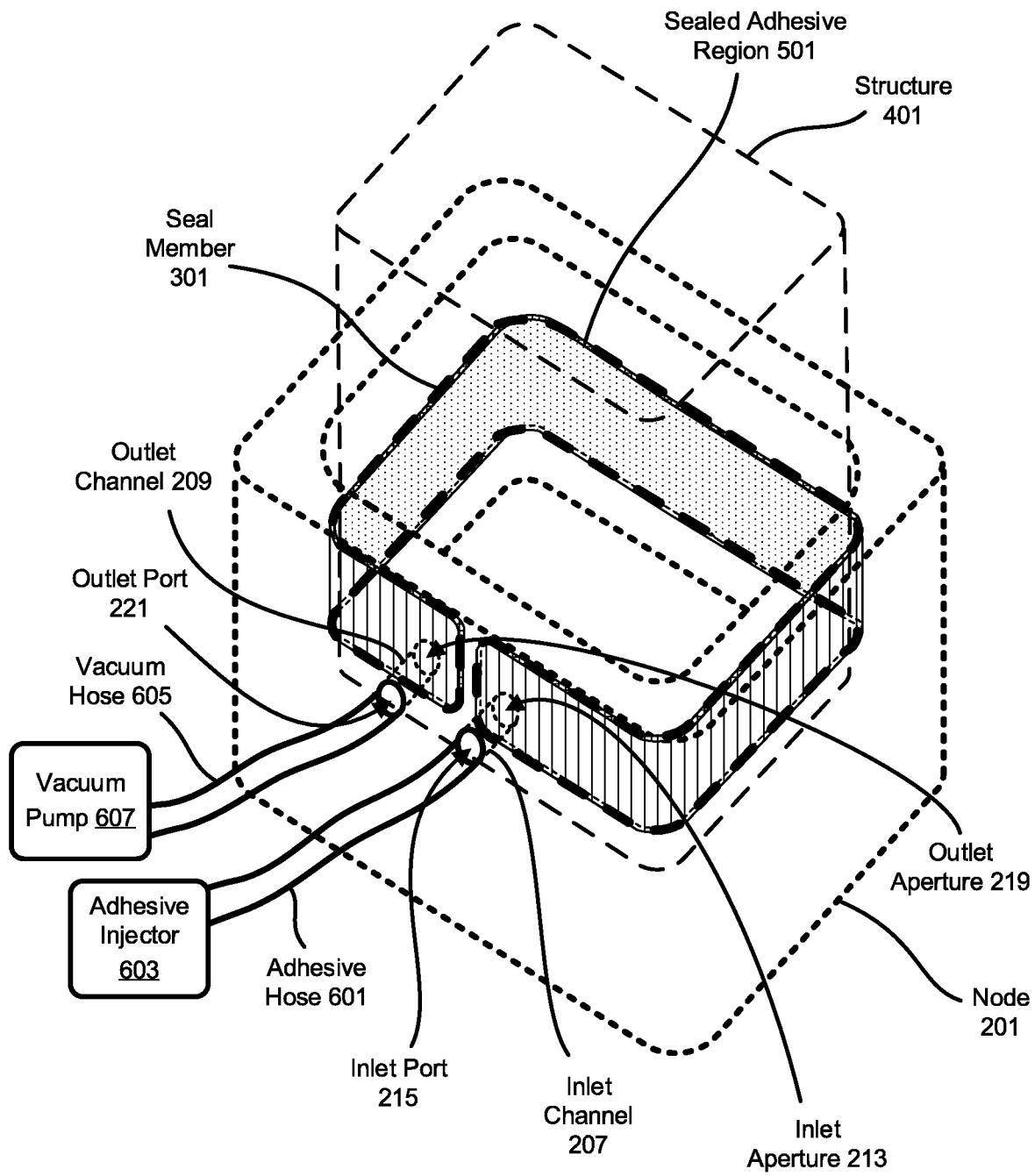
FIGS. 6-11 illustrate exemplary processes for adhesive application to adhere the exemplary node to the exemplary structure.

FIGS. 6-11 illustrate exemplary processes for adhesive application to adhere node 201 to structure 401. As shown in FIG. 6, an adhesive hose 601 can be connected to inlet port 215. The other end of adhesive hose 601 can be connected to an adhesive injector 603 that can inject adhesive through the adhesive hose. Likewise, a vacuum hose 605 can be connected to outlet port 221. The other end of vacuum hose 605 can be connected to a vacuum pump 607 that can draw a vacuum through the vacuum hose.

Figure 7:
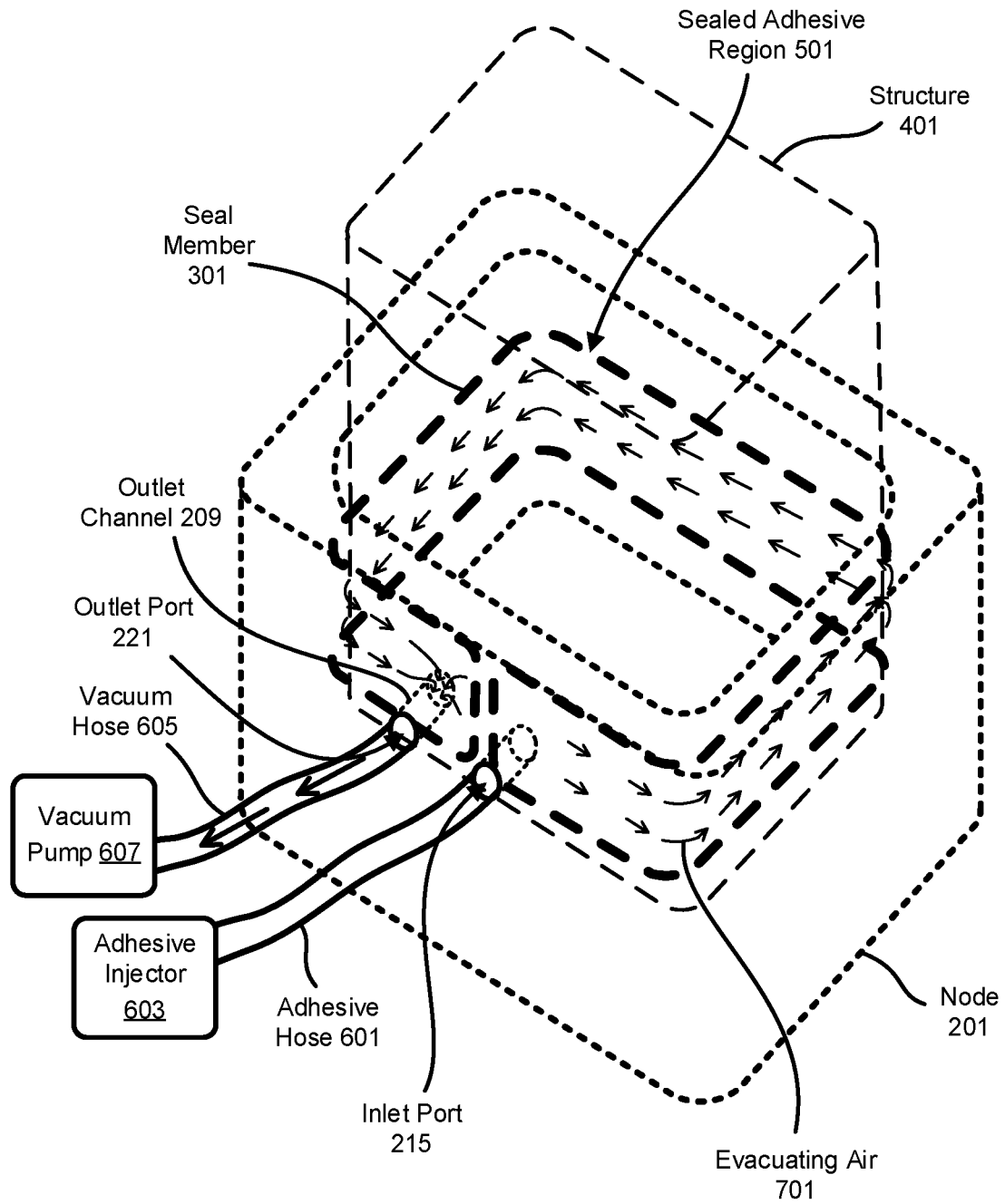

Referring to FIG. 7, vacuum pump 607 can operate to draw a vacuum in sealed adhesive region 501 through outlet channel 209. Evacuating air 701 can be drawn through sealed adhesive region 501 and out outlet channel 209 to establish a vacuum in the sealed adhesive region. The quality of the vacuum can be just sufficient to aid the flow of adhesive through sealed adhesive region 501. In various embodiments, the inlet port can include a mechanism, such as a valve, that can be shut in order to seal off the inlet channel while the sealed adhesive region is evacuated. In various embodiments, the inlet port can be a simple opening to which the adhesive hose can attach, and the air in the adhesive hose can be drawn through the inlet channel and evacuated along with the air in the sealed adhesive region.

Figure 8:
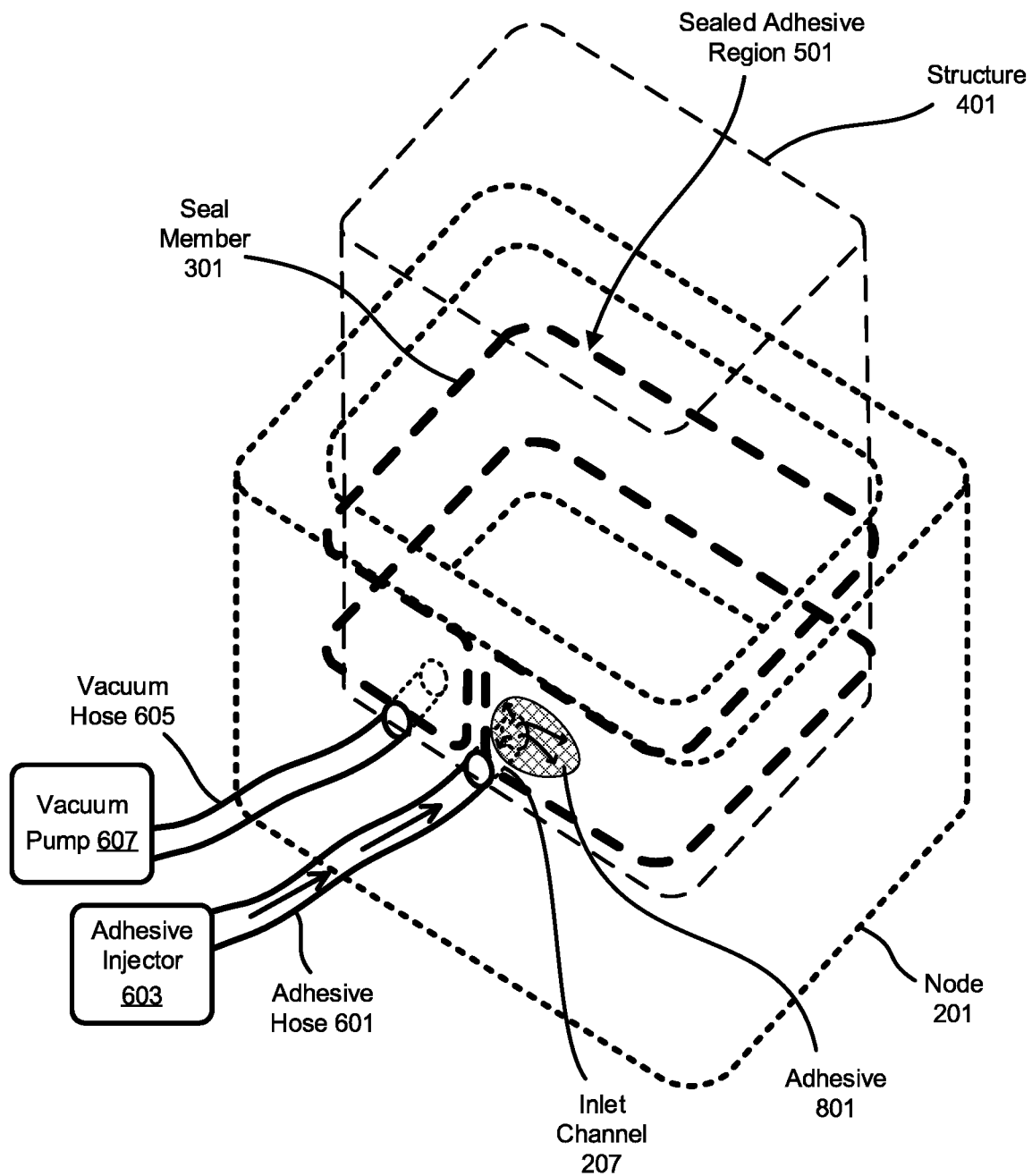

Referring to FIG. 8, adhesive injector 603 can operate to inject an adhesive 801 through inlet channel 207 into sealed adhesive region 501. In various embodiments, the vacuum pump can continue to operate while the adhesive is being injected into the sealed adhesive region, which may be helpful if the vacuum pump is not powerful enough to draw a substantial vacuum in the sealed adhesive region. In various embodiments, the outlet port can include a mechanism, such as a valve, that can be shut in order to seal off the outlet channel while the adhesive is injected. In various embodiments, no vacuum is drawn in the sealed adhesive region, and the outlet channel can be open to the atmosphere to allow air to escape from the sealed adhesive region when the adhesive is injected.

Figure 9:
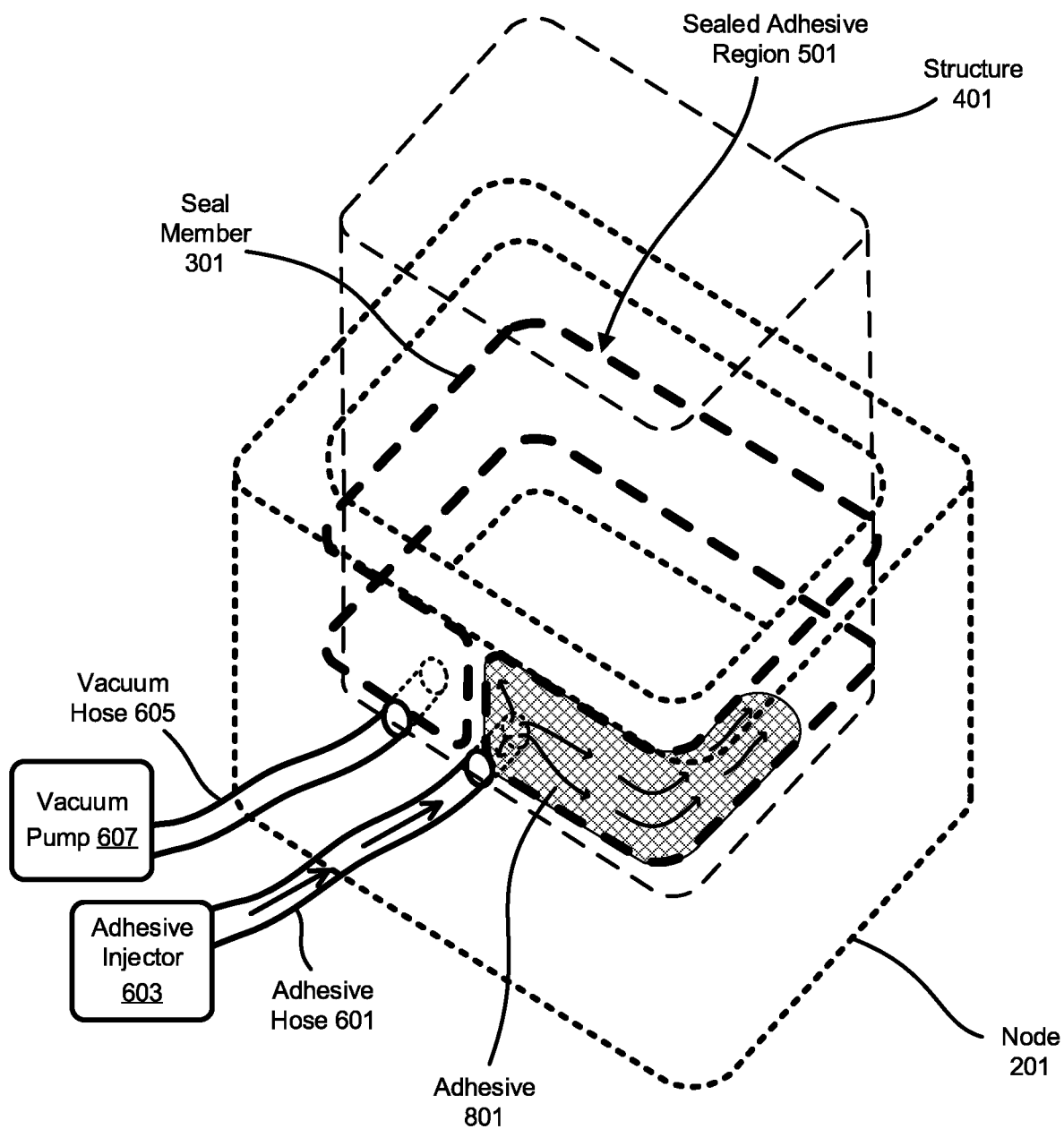
Figure 10:
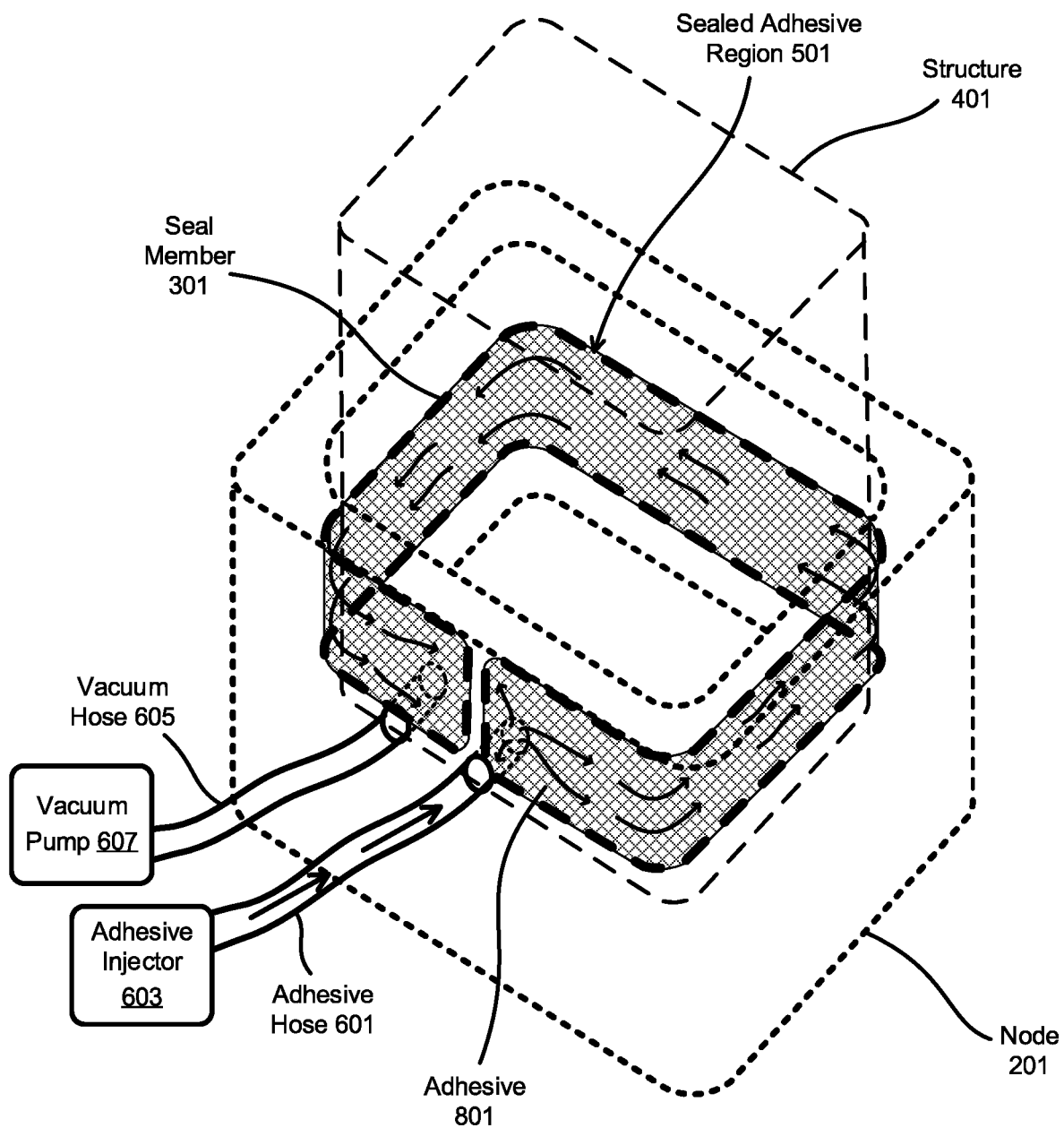

FIG. 9 shows the injection of adhesive 801 at a later time when the adhesive has flowed through more of sealed adhesive region 501. FIG. 10 shows the injection of adhesive 801 after the adhesive has travelled through the entire length of sealed adhesive region 501. The proximity of inlet channel 207 to the first end and the proximity of outlet channel 209 to the second end can be just sufficient to allow adhesive 801 to reach the first and second ends of sealed adhesive region 501 during the adhesive application process.

Figure 11:
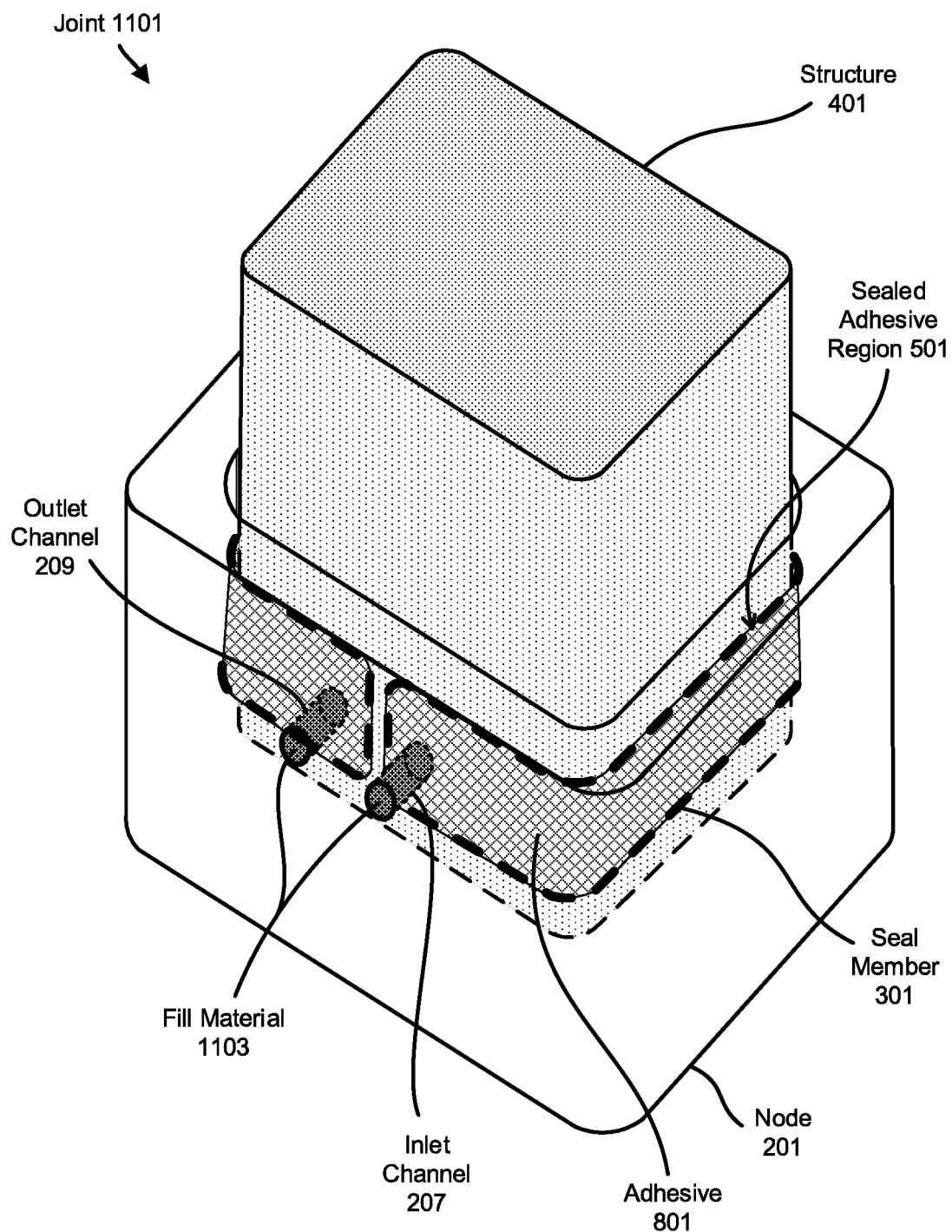

FIG. 11 illustrates an exemplary final product, joint 1101, of the adhesive application process described above to adhere node 201 to structure 401. In this example, fill material 1103 is deposited in inlet channel 207 and outlet channel 209, and adhesive 801 is allowed to cure. In various embodiments, fill material is not deposited in the adhesive and outlet channels, that is, the channels are left open.

In various embodiments, a vacuum pump is not used. For example, adhesive can be applied through the inlet port using an adhesive injector without use of a vacuum pump, e.g., using the positive injection pressure of the injector to cause the adhesive to flow through the adhesive region to the outlet port. In various embodiments, adhesive can be applied by pouring a liquid adhesive into the inlet port, e.g., using gravity to cause the adhesive to flow through the adhesive region to the outlet port.

Figures 15A, 15B:
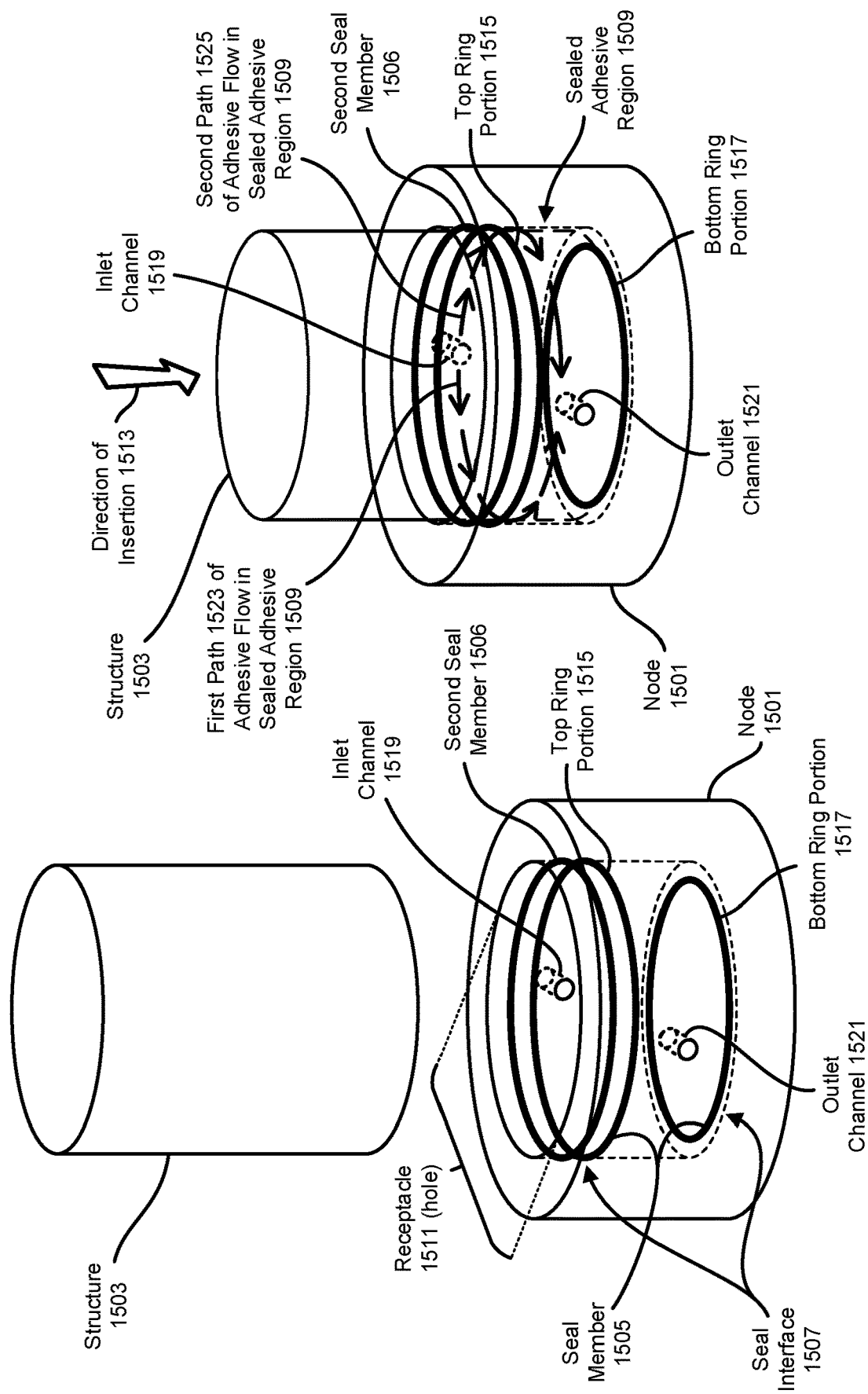
FIGS. 15A-B illustrate an exemplary embodiment including a node, a structure, a seal member, and a second seal member.

In various embodiments, seal members can be configured to meet specific design requirements of the joints. For example, seal members can create a variety of separation distances between components of joints. In various embodiments, seal members can create larger separation distances between components in order to reduce or prevent a reaction between the components. For example, a larger separation distance may be helpful to reduce or prevent galvanic corrosion, particularly in joints that have adjacent components with very different electrode potentials. Seal members can be made of a variety of materials, such as rubber, adhesive, plastic, etc. The material composition of a seal member can be designed to provide a particular benefit during assembly of the node and the structure prior to adhesive application, such as providing flexibility of movement among joint components, providing rigidity to reduce or prevent movement among joint components. Upon adhesive application and subsequent curing of the adhesive, the seal members can make the joint water resistant or waterproof and improve the joint's resistant to other substances, such as oil, grease, dirt, etc. In various embodiments, seal members can isolate structures from each other. For example, FIGS. 15A-B illustrate an example including a seal member that is provided at the bottom of the node surface such that the structure rests on the seal member after insertion into the node's receptacle. In this way, for example, seal members can be used as a measure to prevent galvanic corrosion between the node and the structure when they are made of dissimilar materials.

Figure 12:
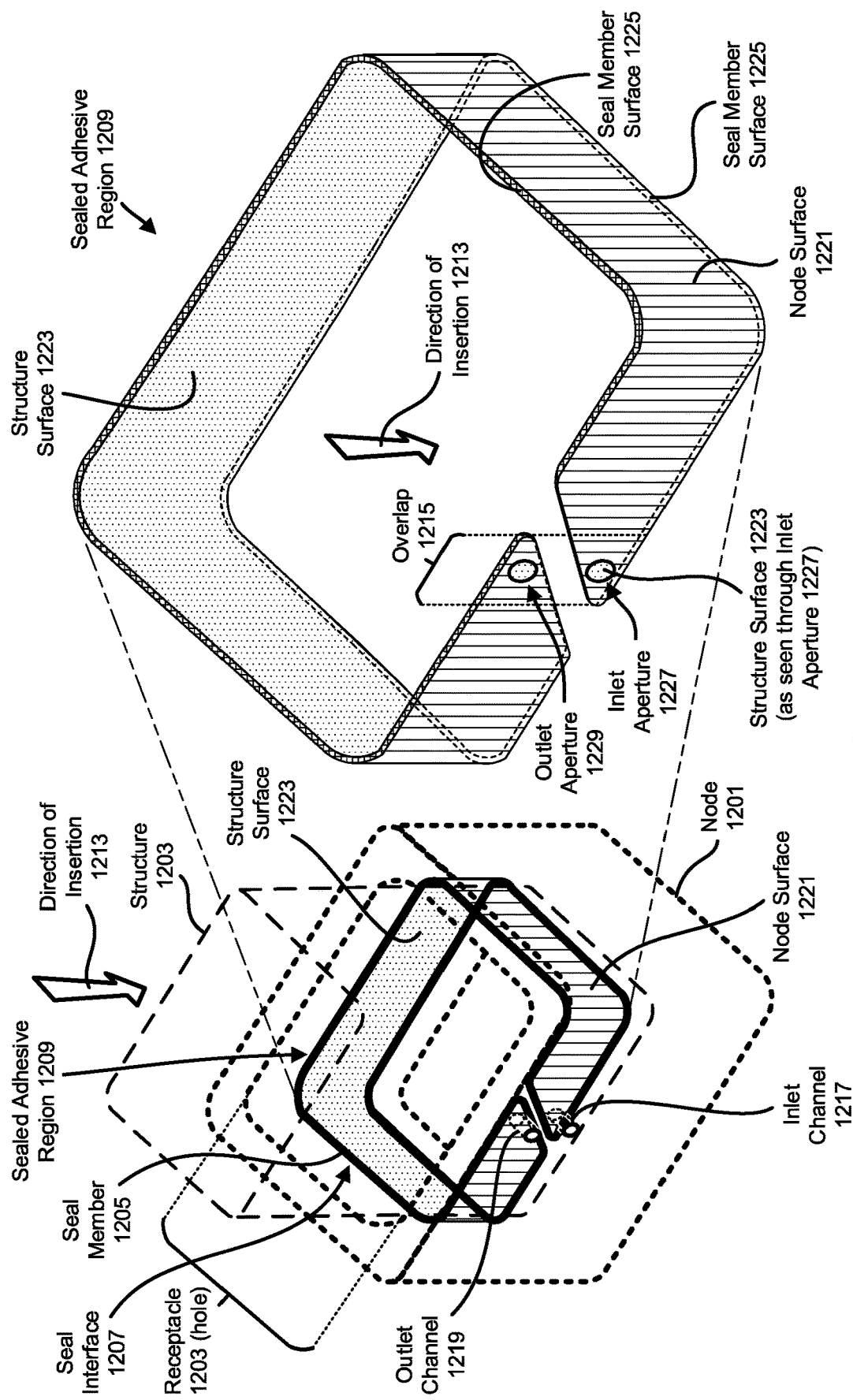
FIG. 12 illustrates an exemplary embodiment including a node, a structure, and a seal member seated on a seal interface.
Figure 13:
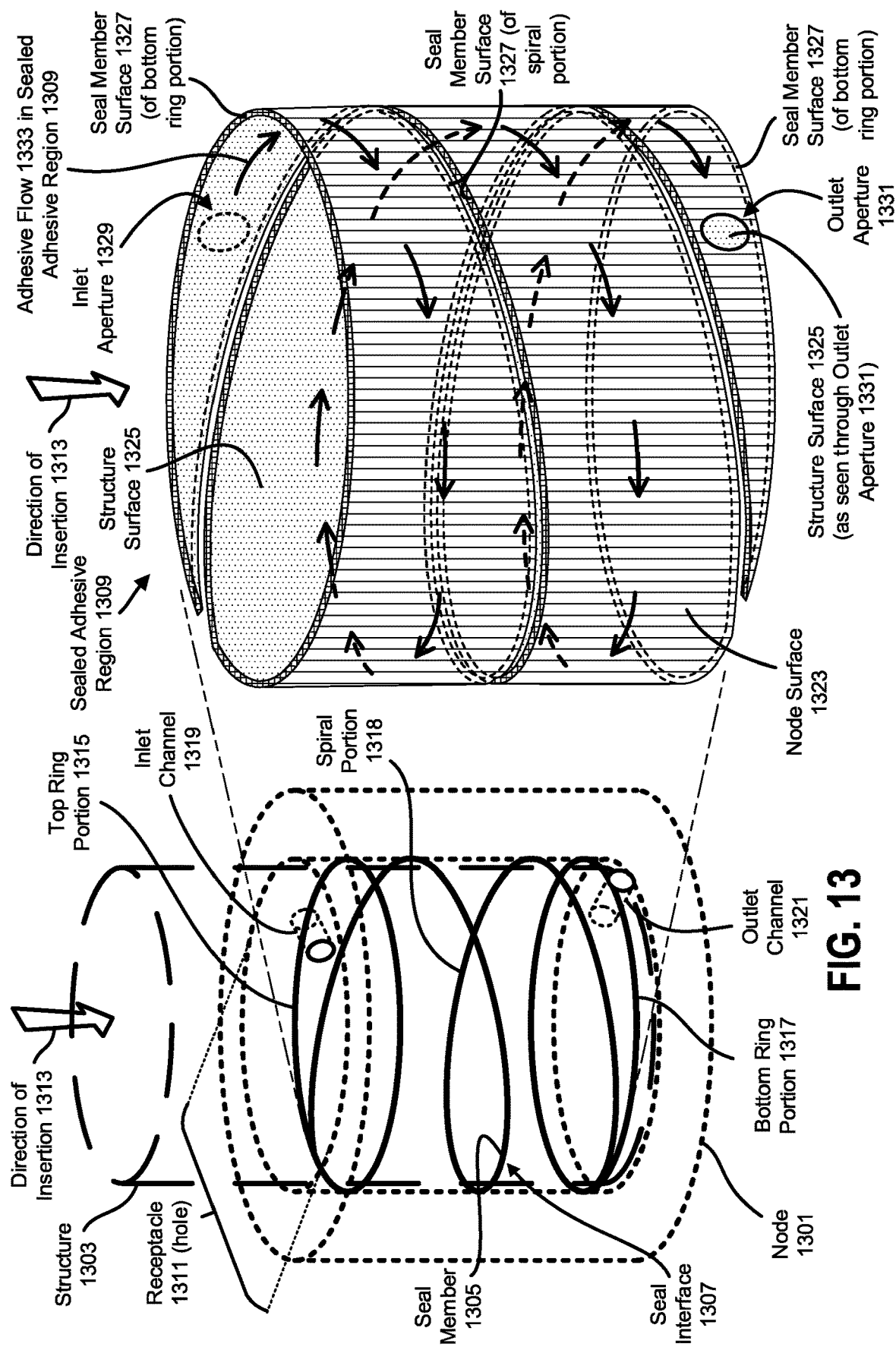
FIG. 13 illustrates another exemplary embodiment including a node, a structure, and a seal member seated on a seal interface.
Figure 14:
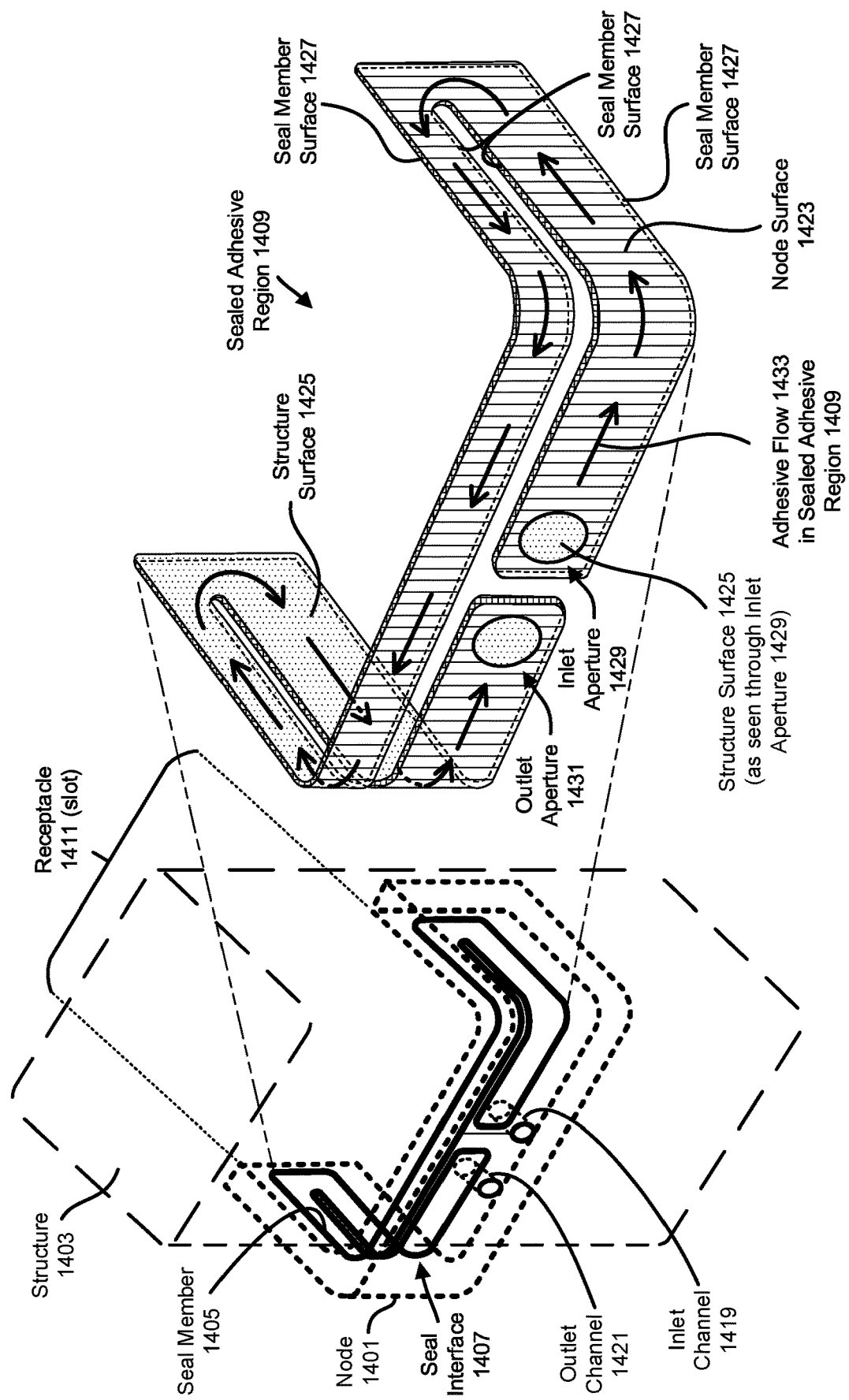
FIG. 14 illustrates another exemplary embodiment including a node, a structure, and a seal member seated on a seal interface.

FIGS. 12, 13, 14, 15A-B, and 16A-B illustrate various other exemplary nodes and node-structure joints. In particular, FIGS. 12 and 13 illustrate examples in which portions of the sealed adhesive region can overlap in a direction of insertion of the structure. FIG. 14 illustrates an example in which the receptacle of the node can be a slot. FIGS. 15A-B illustrate an example in which an additional seal member can be included for the purpose of, for example, providing the adhesive with additional protection from environmental factors such as dust, humidity, etc. FIGS. 16A-B illustrate an example in which the seal member can include a portion attached to the structure, which can be seated on a chamfered edge of the node surface. In various embodiments, the entire seal member can be attached to the structure.

It should be noted that the seal members in the following figures are represented by solid lines for the purpose of clarity. In addition, the nodes and structures in FIGS. 12-14 are represented by dashed lines to provide a clearer view of the sealed adhesive regions of these embodiments.

FIG. 12 illustrates an exemplary embodiment including a node 1201, a structure 1203, and a seal member 1205 seated on a seal interface 1207. Node 1201, structure 1203, and seal member 1205 can fit together to form a sealed adhesive region 1209 when the structure is inserted in a receptacle 1211 of the node in a direction of insertion 1213. In this example, seal interface 1207 can be configured to seat sealed adhesive region 1209 such that a first portion of the sealed adhesive region forms an overlap 1215 with a second portion of the sealed adhesive region in the direction of insertion 1213. In this way, for example, overlap 1215 can provide additional strength of the attachment between node 1201 and structure 1203.

In particular, seal interface 1207 can be configured to extend around a perimeter of structure 1203, such that a portion of a first end of sealed adhesive region 1209 forms overlap 1215 with a portion of a second end of the sealed adhesive region in the direction of insertion 1213. Node 1201 can include an inlet channel 1217 that connects to sealed adhesive region 1209 proximate to the first end, and can include an outlet channel 1219 that connects to the sealed adhesive region proximate to the second end. The proximity of inlet channel 1217 to the first end and the proximity of outlet channel 1219 to the second end can be just sufficient to allow an adhesive injected into the inlet channel to reach the first and second ends of sealed adhesive region 1209 during an adhesive application process, such as the process described above with respect to FIGS. 6-11.

More specifically, inlet channel 1217 can connect an opening in a node surface 1221 of receptacle 1211 to an opening in an exterior surface (not labeled) of node 1201 with a port and inlet similar to those described above with reference to node 201. Likewise, outlet channel 1219 can connect an opening in node surface 1221 to an opening in the exterior surface of node 1201 with a port and inlet similar to those described above with reference to node 201.

Structure 1203 can have a structure surface 1223 that opposes node surface 1221 when the structure is inserted in receptacle 1211. When structure 1203 is inserted in receptacle 1211, structure surface 1223 contacts seal member 1205, thus creating a space bounded by the structure surface, node surface 1221, and the seal member; this space is sealed adhesive region 1209. In other words, sealed adhesive region 1209 is a space bounded by node surface 1221, structure surface 1223, and a portion of the surface of seal member 1205, which is shown as seal member surface 1225 in the unobstructed, magnified view of the sealed adhesive region in FIG. 12.

In this example, sealed adhesive region 1209 is an adhesive region that has a thin, rectangular cross-section and that extends around the perimeter of structure 1203 with one end located at an inlet aperture 1227, which is the opening in node surface 1221 to inlet channel 1217, and the other end located at an outlet aperture 1229, which is the opening in the node surface to outlet channel 1219. Furthermore, a first portion of sealed adhesive region 1209 forms overlap 1215 with a second portion of the sealed adhesive region in the direction of insertion 1213.

In this regard, it can be seen that seal interface 1207 of node 1201 and seal member 1205 are configured to extend around the perimeter of structure 1203 inserted in receptacle 1211, such that sealed adhesive region 1209 extends around the perimeter of the structure with a first end of the sealed adhesive region opposing a second end of the sealed adhesive region. Inlet channel 1217 connects to sealed adhesive region 1209 proximate to the first end through inlet aperture 1227, and outlet channel 1219 connects to the sealed adhesive region proximate to the second end through outlet aperture 1229. In this way, for example, one end of sealed adhesive region 1209 can be open to the exterior surface of node 1201 through inlet channel 1217, and the other end of the sealed adhesive region can be open to the exterior surface of the node through outlet channel 1219. Therefore, sealed adhesive region 1209 can be accessible through an inlet port (not labeled) of inlet channel 1217 and an outlet port (not labeled) of outlet channel 1219 for an adhesive application process such as the example process described above with reference to FIGS. 6-11.

FIG. 13 illustrates an exemplary embodiment including a node 1301, a structure 1303, and a seal member 1305 seated on a seal interface 1307. Node 1301, structure 1303, and seal member 1305 can fit together to form a sealed adhesive region 1309 when the structure is inserted in a receptacle 1311 of the node in a direction of insertion 1313. In this example, seal interface 1307 can be configured to seat seal member 1305, the seal member including a top ring portion 1315 around structure 1303, a bottom ring portion 1317 around the structure, and a spiral portion 1318 extending from the top ring portion to the bottom ring portion and spiraling around the structure. In this way, for example, multiple portions of sealed adhesive region 1309 can overlap each other in direction of insertion 1313. In this example, every portion of sealed adhesive region 1309 overlaps with one or two other portions of the sealed adhesive region. In this way, for example, the overlapping of sealed adhesive region 1309 can provide additional strength of the attachment between node 1301 and structure 1303.

Node 1301 can include an inlet channel 1319 that connects to sealed adhesive region 1309 proximate to a first end of the sealed adhesive region bounded by top ring portion 1315, and can include an outlet channel 1321 that connects to the sealed adhesive region proximate to a second end of the sealed adhesive region bounded by bottom ring portion 1317. The proximity of inlet channel 1319 to the first end and the proximity of outlet channel 1321 to the second end can be just sufficient to allow an adhesive injected into the inlet channel to reach the first and second ends of sealed adhesive region 1309 during an adhesive application process, such as the process described above with respect to FIGS. 6-11.

More specifically, inlet channel 1319 can connect an opening in a node surface 1323 of receptacle 1311 to an opening in an exterior surface (not labeled) of node 1301 with a port and inlet similar to those described above with reference to node 201. Likewise, outlet channel 1321 can connect an opening in node surface 1323 to an opening in the exterior surface of node 1301 with a port and inlet similar to those described above with reference to node 201.

Structure 1303 can have a structure surface 1325 that opposes node surface 1323 when the structure is inserted in receptacle 1311. When structure 1303 is inserted in receptacle 1311, structure surface 1325 contacts seal member 1305, thus creating a space bounded by the structure surface, node surface 1323, and the seal member; this space is sealed adhesive region 1309. In other words, sealed adhesive region 1309 is a space bounded by node surface 1323, structure surface 1325, and a portion of the surface of seal member 1305, which is shown as seal member surface 1327 in the unobstructed, magnified view of the sealed adhesive region in FIG. 13.

In this example, sealed adhesive region 1309 is an adhesive region that has a thin, rectangular cross-section and that extends around the perimeter of structure 1303 as a spiral with one end located at an inlet aperture 1329, which is the opening in node surface 1323 to inlet channel 1319, and the other end located at an outlet aperture 1331, which is the opening in the node surface to outlet channel 1321.

In this regard, it can be seen that seal interface 1307 of node 1301 and seal member 1305 are configured to form a spiral around the perimeter of structure 1203 and to form boundaries at the top and bottom of the spiral, such that sealed adhesive region 1309 extends around the perimeter of the structure as a spiral with a first end of the sealed adhesive region at the top of the spiral and a second end of the sealed adhesive region at the bottom of the spiral. Inlet channel 1319 connects to sealed adhesive region 1309 proximate to the first end through inlet aperture 1329, and outlet channel 1321 connects to the sealed adhesive region proximate to the second end through outlet aperture 1321. In this way, for example, one end of sealed adhesive region 1309 can be open to the exterior surface of node 1301 through inlet channel 1319, and the other end of the sealed adhesive region can be open to the exterior surface of the node through outlet channel 1321. Therefore, sealed adhesive region 1309 can be accessible through an inlet port (not labeled) of inlet channel 1319 and an outlet port (not labeled) of outlet channel 1321 for an adhesive application process such as the example process described above with reference to FIGS. 6-11. FIG. 13 includes arrows illustrating the direction of an adhesive flow 1333 through sealed adhesive region 1309 from inlet aperture 1329 to outlet aperture 1331.

FIG. 14 illustrates an exemplary embodiment including a node 1401, a structure 1403, and a seal member 1405 seated on a seal interface 1407. Node 1401, structure 1403, and seal member 1405 can fit together to form a sealed adhesive region 1409 when the structure is inserted in a receptacle 1411. In this example, receptacle 1411 can be a slot in node 1401. In other words, receptacle 1411 extends only partway around a perimeter of structure 1403. In this example, structure 1403 can be inserted into node 1401 in different directions of insertion.

Node 1401 can include an inlet channel 1419 that connects to sealed adhesive region 1409 proximate to a first end of the sealed adhesive region, and can include an outlet channel 1421 that connects to the sealed adhesive region proximate to a second end of the sealed adhesive region. The proximity of inlet channel 1419 to the first end and the proximity of outlet channel 1421 to the second end can be just sufficient to allow an adhesive injected into the inlet channel to reach the first and second ends of sealed adhesive region 1409 during an adhesive application process, such as the process described above with respect to FIGS. 6-11.

More specifically, inlet channel 1419 can connect an opening in a node surface 1423 of receptacle 1411 to an opening in an exterior surface (not labeled) of node 1401 with a port and inlet similar to those described above with reference to node 201. Likewise, outlet channel 1421 can connect an opening in node surface 1423 to an opening in the exterior surface of node 1401 with a port and inlet similar to those described above with reference to node 201.

Structure 1403 can have a structure surface 1425 that opposes node surface 1423 when the structure is inserted in receptacle 1411. When structure 1403 is inserted in receptacle 1411, structure surface 1425 contacts seal member 1405, thus creating a space bounded by the structure surface, node surface 1423, and the seal member; this space is sealed adhesive region 1409. In other words, sealed adhesive region 1409 is a space bounded by node surface 1423, structure surface 1425, and a portion of the surface of seal member 1405, which is shown as seal member surface 1427 in the unobstructed, magnified view of the sealed adhesive region in FIG. 14.

In this example, sealed adhesive region 1409 is an adhesive region that has a thin, rectangular cross-section and that extends only partway around the perimeter of structure 1403 with one end located at an inlet aperture 1429, which is the opening in node surface 1423 to inlet channel 1419, and the other end located at an outlet aperture 1431, which is the opening in the node surface to outlet channel 1421. Inlet channel 1419 connects to sealed adhesive region 1409 proximate to a first end of the sealed adhesive region through inlet aperture 1429, and outlet channel 1421 connects to the sealed adhesive region proximate to a second end of the sealed adhesive region through outlet aperture 1421. In this way, for example, one end of sealed adhesive region 1409 can be open to the exterior surface of node 1401 through inlet channel 1419, and the other end of the sealed adhesive region can be open to the exterior surface of the node through outlet channel 1421. Therefore, sealed adhesive region 1409 can be accessible through an inlet port (not labeled) of inlet channel 1419 and an outlet port (not labeled) of outlet channel 1421 for an adhesive application process such as the example process described above with reference to FIGS. 6-11. FIG. 14 includes arrows illustrating the direction of an adhesive flow 1433 through sealed adhesive region 1409 from inlet aperture 1429 to outlet aperture 1431.

FIGS. 15A-B illustrate an exemplary embodiment including a node 1501, a structure 1503, a seal member 1505, and a second seal member 1506. Seal member 1505 and second seal member 1506 can be seated on a seal interface 1507. Node 1501, structure 1503, and seal member 1505 can fit together to form a sealed adhesive region 1509 when the structure is inserted in a receptacle 1511 in a direction of insertion 1513. In this example, seal member 1505 can include a top ring portion 1515 around structure 1503 and a bottom ring portion 1517 around the structure. Second seal member 1506 can form a seal between node 1501 and structure 1503 to provide, for example, further protection of the adhesive bond from environmental conditions, additional guidance for insertion of the structure into receptacle 1511, enhanced rigidity of the finished joint, a more rigid structure for keeping the node and the structure separated, etc.

Node 1501 can include an inlet channel 1519 that connects to sealed adhesive region 1509 proximate to a first end of the sealed adhesive region, and can include an outlet channel 1521 that connects to the sealed adhesive region proximate to a second end of the sealed adhesive region. In this example, sealed adhesive region 1509 has two separate channels for adhesive to flow from inlet channel 1519 to outlet channel 1521; the channels are illustrated in FIG. 15B by arrows of a first path 1523 of adhesive flow in sealed adhesive region 1509 and a second path 1525 of adhesive flow in sealed adhesive region 1509. The proximity of inlet channel 1519 to the first end and the proximity of outlet channel 1521 to the second end can be just sufficient to allow an adhesive injected into the inlet channel to reach the first and second ends of sealed adhesive region 1509 during an adhesive application process, such as the process described above with respect to FIGS. 6-11.

FIGS. 16A-B illustrate an exemplary embodiment including a node 1601, a structure 1603, and a seal member 1605 seated on a seal interface 1607. Node 1601, structure 1603, and seal member 1605 can fit together to form a sealed adhesive region 1609 when the structure is inserted in a receptacle 1611 of node 1601 in a direction of insertion 1613. In this example, seal member 1605 can include a top ring portion 1615 that is positioned on structure 1603. In various embodiments, for example, top ring portion 1615 can be inserted into a groove around structure 1603, can be attached to the structure with an adhesive, can be held in place with a flange around the structure, etc. The surface of receptacle 1611 can include a chamfered edge 1616, and the chamfered edge can be a part of seal interface 1607. In particular, chamfered edge 1616 can receive top ring portion 1615 when structure 1603 is inserted in receptacle 1611, such that the top ring portion is seated on the chamfered edge. In this way, for example, chamfered edge 1616 and top ring portion 1615 can be configured to stop the insertion of structure 1603 when the structure has reached a desired position in receptacle 1611, at which point the top ring portion is seated on the chamfered edge. In addition, chamfered edge 1616 can help to center structure 1603 within receptacle 1611 as top ring portion 1615 is guided by the configuration of the chamfered edge prior to settling in the seated position. Seal member 1605 can also include a bottom ring portion 1617 positioned in receptacle 1611 of node 1601.

Node 1601 can include an inlet channel 1619 that connects to sealed adhesive region 1609 proximate to a first end of the sealed adhesive region, and can include an outlet channel 1621 that connects to the sealed adhesive region proximate to a second end of the sealed adhesive region. In this example, sealed adhesive region 1609 has two channels for adhesive to flow from inlet channel 1619 to outlet channel 1621; the channels are illustrated in FIG. 16B by arrows of a first path 1623 of adhesive flow in sealed adhesive region 1609 and a second path 1625 of adhesive flow in the sealed adhesive region. The proximity of inlet channel 1619 to the first end and the proximity of outlet channel 1621 to the second end can be just sufficient to allow, during an adhesive injection process such as the process described above with respect to FIGS. 6-11, the portion of the adhesive traveling through first path 1623 to reach outlet channel 1621 at substantially the same time as the portion of the adhesive traveling through second path 1625.

In various embodiments, the bottom ring portion can be positioned on the structure, instead of in the receptacle. In other words, both a top ring portion and a bottom ring portion can be positioned on the structure prior to the structure's insertion into the receptacle of the node. The bottom ring portion can be, for example, inserted into a groove around the structure, can be attached to the structure with an adhesive, can be held in place with a flange around the structure, etc. The bottom ring portion can be configured to slide on the surface of the receptacle when the structure is inserted into the receptacle. When the top ring portion becomes seated on the chamfered edge, the bottom ring portion can come to rest and be seated on another part of the seal interface. For example, the bottom ring portion can come to rest on a polished portion of the node surface, can slide into a groove in the node surface and come to rest in the groove, can slide to abut a flange on the node surface and come to rest against the flange, etc.

FIG. 17 is a flowchart that illustrates an exemplary process of adhering an additively manufactured node to a structure. The node can include a receptacle extending into the node. A seal member can be arranged (1701) in the receptacle, and the structure can be inserted (1702) into the receptacle. The structure can include a surface that opposes a surface of the receptacle, such that an adhesive region can be formed between the node and the structure. The adhesive region can be bounded by the surface of the receptacle, the surface of the structure opposing the node surface, and the seal member.

In some embodiments, the seal member can be arranged in the receptacle prior to insertion of the structure into the receptacle. For example, the seal member can be seated on a seal interface at a surface of the receptacle prior to insertion of the structure, as in the examples illustrated in FIGS. 2A-B, 3A-B, 4A-B, 5, 12-14, and 15A-B.

In some embodiments, a portion of the seal member or the entire seal member can be positioned on the structure prior to insertion of the structure into the receptacle, as in the example of FIG. 16A-B in which a portion of the seal member is positioned on the structure. In this case, the seal member can be arranged in the receptacle after the structure is inserted into the receptacle and comes to rest at a final position, at which point the seal member can be seated on the seal interface of the node surface. In this regard, the temporal order of arranging (1701) the seal member in the receptacle and inserting (1702) the structure into the receptacle can be reversed, i.e., inserting the structure occurs before arranging the seal member in the receptacle.

In some embodiments, part of the seal member can be attached to the structure and part of the seal member can be arranged in the receptacle of the node prior to insertion of the structure into the receptacle, as in the example illustrated in FIG. 16. In this case, it may not make sense to think of the arranging and the inserting as occurring in a particular temporal order. Therefore, the arranging (1701) and the inserting (1702) in the flowchart of FIG. 17 should not be interpreted as occurring in a particular temporal order, but should be interpreted as including various ways to achieve the arranging of the seal member in the receptacle.

Once a sealed adhesive region is formed, an adhesive can be injected (1703) into the sealed adhesive region to adhere the node to the structure. In various embodiments, a vacuum can be created in the sealed adhesive region to evacuate the sealed adhesive region, and the adhesive can be injected into the evacuated sealed adhesive region. The quality of the vacuum can be just sufficient to aid the flow of adhesive through the sealed adhesive region. In various embodiments, creating the vacuum can include evacuating the sealed adhesive region through a channel (e.g., a vacuum channel described in the foregoing examples) that extends from an exterior of the node to the sealed adhesive region. In various embodiments, injecting the adhesive can include injecting the adhesive through a channel (e.g., an inlet channel described in the foregoing examples). In various embodiments, the outlet channel and the inlet channel can be the same channel. For example, a vacuum pump can be attached to single channel to evacuate the sealed adhesive region, the single channel can be closed off, an adhesive injector can be attached to the single channel, the single channel can be opened, and the adhesive injector can inject adhesive into the evacuated sealed adhesive region. In various embodiments, the vacuum channel and the inlet channel can be separate channels.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, and/or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
   an additively manufactured node having a receptacle extending into the node, the receptacle including a first surface, and the node including an exterior surface, a first channel connecting the exterior surface to the first surface, and a second channel connecting the exterior surface to the first surface;
   a structure inserted in the receptacle, the structure including a second surface opposing the first surface;
   a seal member arranged between the node and the structure, wherein an adhesive region between the node and the structure is bounded by the first surface, the second surface, and a surface of the seal member, the adhesive region connecting to each of the first and second channels; and
   an adhesive arranged in the adhesive region, wherein the adhesive adjoins the seal member surface and attaches the first surface to the second surface, and wherein
   the adhesive region extends around a perimeter of the structure and a portion of a first end of the adhesive region overlaps a portion of a second end of the adhesive region in a direction of insertion of the structure in the receptacle, and
   the first channel connects to the adhesive region proximate to the first end, and the second channel connects to the adhesive region proximate to the second end.

2. The apparatus of claim 1, further comprising:
   a fill material filling the first and second channels.

3. The apparatus of claim 1, wherein the receptacle includes a hole.

4. The apparatus of claim 1, wherein the adhesive region is hermetically sealed.

5. The apparatus of claim 1, wherein the first end of the adhesive region opposes the second end of the adhesive region.

6. The apparatus of claim 1, wherein the seal member includes a first seal member portion around the structure, a second seal member portion around the structure, and a third seal member portion extending from the first seal member portion to the second seal member portion and spiraling around the structure, the first channel connecting to the adhesive region proximate to the first seal member portion, and the second channel connecting to the adhesive region proximate to the second seal member portion.

7. The apparatus of claim 1, further comprising:
   a second seal member around the structure, wherein the second seal member is arranged outside the adhesive region.

8. The apparatus of claim 7, further comprising:
   a third seal member around the structure, wherein the third seal member is arranged outside the adhesive region, and the adhesive region is arranged between the second and third seal members.

9. The apparatus of claim 1, wherein the first surface of the receptacle includes one or more grooves, and a portion of the seal member is arranged in the one or more grooves.

10. The apparatus of claim 1, wherein the seal member includes a seal attached to the structure.

11. The apparatus of claim 10, wherein the first surface includes a chamfered edge of the node, and the seal member attached to the structure abuts the chamfered edge.

* * * * *